US012810349B2

(12) United States Patent
Pincumbe et al.

(10) Patent No.: US 12,810,349 B2
(45) Date of Patent: Nov. 24, 2026

(54) SYSTEMS AND METHODS OF CONTROLLING DEVICES IN IMPLEMENTING MULTI-SESSION RETAIL PURCHASES

(71) Applicant: Walmart Apollo, LLC, Bentonville, AR (US)

(72) Inventors: Timothy J. Pincumbe, Richardson, TX (US); Benjamin T. Ford, Redmond, OR (US); Michael A. Guin, Los Angeles, CA (US); Rongjin Hong, Santa Clara, CA (US); Lars C. Rehder, San Bruno, CA (US); Priyanka Paliwal, Grapevine, TX (US); Sheetal Patel, McKinney, TX (US); Khasan Shirmatov, McKinney, TX (US); Roman Sentsov, Sacramento, CA (US); Artem Pechenkin, Los Angeles, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 755 days.

(21) Appl. No.: 18/103,369

(22) Filed: Jan. 30, 2023

(65) Prior Publication Data

US 2024/0257225 A1 Aug. 1, 2024

(51) Int. Cl.
*G06Q 30/0601* (2023.01)
*G06Q 20/20* (2012.01)
(Continued)

(52) U.S. Cl.
CPC ......... *G06Q 30/0643* (2013.01); *G06Q 20/20* (2013.01); *G06Q 20/3267* (2020.05);
(Continued)

(58) Field of Classification Search
CPC . G06Q 30/0601–0645; G06Q 30/0643; G06Q 20/3267; G06Q 20/20;
(Continued)

(56) References Cited

U.S. PATENT DOCUMENTS

| | | | |
|---|---|---|---|
| 5,055,660 | A | 10/1991 | Bertagna |
| 5,457,307 | A | 10/1995 | Dumont |

(Continued)

FOREIGN PATENT DOCUMENTS

| | | |
|---|---|---|
| CA | 2809523 | 4/2012 |
| EP | 1120071 | 8/2001 |

(Continued)

OTHER PUBLICATIONS

Joel Platini, Ultimate Ecommerce Checkout Practices for your Online Store, Retainful, Aug. 18, 2020 (Year: 2020).*

(Continued)

*Primary Examiner* — Anna Mae Mitros
(74) *Attorney, Agent, or Firm* — Foley IP Law, PLLC

(57) ABSTRACT

Some embodiments provide systems to device in purchasing retail items, comprise: a product database; a transaction database; and a mobile purchase control circuit configured to: receive a session notification from a mobile customer computing device to initiate an additional purchase session; establish, in response to the session notification, a second purchase session, and link the first and second purchase sessions as a single transaction; incorporate into a second virtual cart, associated with the second purchase session and different than a first virtual cart associated with the first purchase session, item identification information for each of one or more items identified, through the customer computing device, by the customer and intended to be purchased by the customer in association with the second purchase session; and cause a final authentication of the single transac- (Continued)

tion in authenticating at a single time of both the first session and the second session.

18 Claims, 9 Drawing Sheets

(51) Int. Cl.
*G06Q 20/32* (2012.01)
*G06Q 20/38* (2012.01)
*G06Q 20/40* (2012.01)

(52) U.S. Cl.
CPC ....... *G06Q 20/3274* (2013.01); *G06Q 20/389* (2013.01); *G06Q 20/405* (2013.01)

(58) Field of Classification Search
CPC ............. G06Q 20/3274; G06Q 20/389; G06Q 20/405; G06Q 30/0641; G06Q 30/06431; G06Q 30/06432; G06Q 30/06433; G06Q 30/06434; G06Q 30/06435; G06Q 30/0644; G06Q 30/06442; G06Q 30/06443; G06Q 30/06444; G06Q 20/0601–0645
USPC ................................................ 705/26.1–27.2
See application file for complete search history.

(56) References Cited

U.S. PATENT DOCUMENTS 5,489,773 A 2/1996 Kumar
5,689,101 A 11/1997 Kikuchi
5,736,721 A 4/1998 Swartz
5,804,807 A 9/1998 Murrah
5,825,002 A 10/1998 Roslak
5,918,211 A 6/1999 Sloane
5,923,735 A 7/1999 Swartz
5,978,772 A 11/1999 Mold
5,979,753 A 11/1999 Roslak
5,979,757 A 11/1999 Tracy
6,018,397 A 1/2000 Cloutier
6,131,814 A 10/2000 Swartz
6,179,206 B1 1/2001 Matsumori
6,354,496 B1 3/2002 Murphy
6,367,694 B1 4/2002 Roslak
6,382,357 B1 5/2002 Morrison
6,507,279 B2 1/2003 Loof
6,550,672 B1 4/2003 Tracy
6,571,218 B1 5/2003 Sadler
6,598,791 B2 7/2003 Bellis, Jr.
6,601,759 B2 8/2003 Fife
6,606,411 B1 8/2003 Loui
6,685,093 B2 2/2004 Challa
6,745,186 B1 6/2004 Testa
6,804,528 B1 10/2004 Laroia
6,810,149 B1 10/2004 Squilla
6,820,062 B1 11/2004 Gupta
6,837,436 B2 1/2005 Swartz
6,854,651 B2 2/2005 Smith
6,886,101 B2 4/2005 Glazer
6,926,202 B2 8/2005 Noonan
6,937,989 B2 8/2005 McIntyre
7,047,041 B2 5/2006 Marko
7,114,656 B1 10/2006 Garver
7,124,940 B2 10/2006 Som
7,177,820 B2 2/2007 McIntyre
7,194,430 B2 3/2007 Vonholm
7,207,477 B1 4/2007 Ramachandran
7,209,903 B1 4/2007 Mamdani
7,222,363 B2 5/2007 Rice
7,376,583 B1 5/2008 Rolf
7,431,208 B2 10/2008 Feldman
7,493,284 B2 2/2009 Celi, Jr.
7,587,756 B2 9/2009 Peart
7,635,084 B2 12/2009 Wang
7,716,064 B2 5/2010 McIntyre
7,725,326 B1 5/2010 Tracy
7,997,486 B2 8/2011 Ulrich
8,069,092 B2 11/2011 Bryant
8,091,780 B2 1/2012 Todd
8,572,712 B2 10/2013 Rice
8,645,221 B1 2/2014 Sarma
8,720,771 B2 5/2014 Mackinnon Keith
8,751,316 B1 6/2014 Fletchall
8,814,039 B2 8/2014 Bishop
8,820,633 B2 9/2014 Bishop
8,851,369 B2 10/2014 Biship
9,195,981 B2 11/2015 Annan
10,121,133 B2 11/2018 Nelms
10,496,951 B1 12/2019 Kandukuri
10,803,435 B2 10/2020 Nelms
10,872,326 B2 12/2020 Garner
10,915,906 B2 2/2021 Keith
10,990,960 B2 4/2021 Koeppel
11,263,682 B2 3/2022 Karmakar
2002/0060246 A1 5/2002 Gobburu
2002/0096564 A1 7/2002 Bellis
2002/0143655 A1 * 10/2002 Elston .................... H04L 67/52
705/26.81
2002/0145038 A1 10/2002 O'Hagan
2002/0178088 A1 11/2002 Lurie
2003/0015585 A1 1/2003 Wike
2003/0057284 A1 3/2003 Challa
2003/0132298 A1 7/2003 Swartz
2003/0149630 A1 8/2003 Jacobs
2003/0149663 A1 8/2003 Vonholm
2003/0158796 A1 8/2003 Balent
2003/0195818 A1 10/2003 Howell
2004/0056101 A1 3/2004 Barkan
2004/0103034 A1 5/2004 Reade
2004/0171378 A1 9/2004 Rautila
2004/0193499 A1 9/2004 Ortiz
2005/0017071 A1 1/2005 Noonan
2005/0246714 A1 11/2005 Moore
2006/0043175 A1 3/2006 Fu
2006/0108419 A1 5/2006 Som
2006/0124733 A1 6/2006 Matthews
2006/0293968 A1 12/2006 Brice
2007/0051801 A1 3/2007 Garver
2007/0069016 A1 3/2007 Garver
2007/0080219 A1 4/2007 Garver
2007/0080220 A1 4/2007 Garver
2007/0241189 A1 10/2007 Slavin
2007/0255620 A1 11/2007 Tumminaro
2008/0011825 A1 1/2008 Giordano
2008/0133366 A1 6/2008 Evans
2008/0228591 A1 9/2008 Watanabe
2008/0237340 A1 10/2008 Emmons
2008/0296392 A1 12/2008 Connell, II
2009/0043658 A1 2/2009 Webb
2009/0055278 A1 2/2009 Nemani
2009/0088203 A1 4/2009 Havens
2009/0094100 A1 4/2009 Xavier
2009/0099961 A1 4/2009 Ogilvy
2009/0101713 A1 4/2009 Ulrich
2009/0192892 A1 7/2009 Cason
2009/0250515 A1 10/2009 Todd
2009/0261164 A1 10/2009 Sato
2010/0063891 A1 3/2010 Townsend
2010/0082444 A1 4/2010 Lin
2010/0082445 A1 4/2010 Hodge
2010/0082447 A1 4/2010 Lin
2010/0125510 A1 5/2010 Smith
2010/0138344 A1 6/2010 Wong
2010/0259549 A1 10/2010 Brown
2010/0287057 A1 11/2010 Aihara
2011/0075213 A1 3/2011 Murayama
2011/0225057 A1 9/2011 Webb
2011/0251892 A1 10/2011 Laracey
2011/0289113 A1 11/2011 Arling
2012/0054046 A1 3/2012 Albisu
2012/0095853 A1 4/2012 Von Bose
2012/0173351 A1 7/2012 Hanson

(56) References Cited

U.S. PATENT DOCUMENTS

| | | | | |
|---|---|---|---|---|
| 2012/0267432 | A1 | 10/2012 | Kuttuva | |
| 2012/0321146 | A1 | 12/2012 | Kundu et al. | |
| 2013/0290234 | A1 | 10/2013 | Harris | |
| 2015/0106213 | A1 | 4/2015 | Guen | |
| 2015/0348168 | A1* | 12/2015 | Quinn | G06Q 30/0256 705/26.62 |
| 2016/0300217 | A1 | 10/2016 | Grabovski et al. | |
| 2018/0240088 | A1 | 8/2018 | Nelms | |
| 2019/0279198 | A1 | 9/2019 | Laracey | |
| 2020/0134588 | A1 | 4/2020 | Nelms | |
| 2020/0160428 | A1* | 5/2020 | Calvo | G06Q 30/0613 |
| 2020/0402033 | A1* | 12/2020 | Sivan | G06Q 20/202 |
| 2021/0081914 | A1 | 3/2021 | Nelms | |
| 2024/0403847 | A1* | 12/2024 | Sunder | G06Q 20/18 |

FOREIGN PATENT DOCUMENTS

| | | |
|---|---|---|
| GB | 2497842 | 6/2013 |
| JP | 2001325468 | 11/2001 |
| JP | 2002189785 | 7/2002 |
| JP | 2002197384 | 7/2002 |
| JP | 2003140865 | 5/2003 |
| JP | 2003323570 | 11/2003 |
| JP | 2004021607 | 1/2004 |
| JP | 2006146774 | 6/2006 |
| JP | 2010092146 | 4/2010 |
| JP | 2010182105 | 8/2010 |
| JP | 2013541107 | 11/2013 |
| KR | 1020070087811 | 8/2007 |
| WO | 2003060646 | 7/2003 |
| WO | 2003090023 | 10/2003 |
| WO | 2009116954 | 9/2009 |
| WO | 2012051316 | 4/2012 |

OTHER PUBLICATIONS

Rodriquez, Kari, "International Search Report & Written Opinion", International Application No. PCT/US24/12302, mailed Apr. 30, 2024, 9 pages.

U.S. Appl. No. 18/217,945, filed Jul. 3, 2023, Nelms David Martin.

Barbaro, Michael, et al.; "Wal-Mart at Forefront of Hurricane Relief"; Sep. 6, 2005; The Washington Post; pp. 1-4.

*BJ's Wholesale Club Holdings, Inc.* v. *Walmart Apollo, LLC*; AIA Review No. IPR2022-01471; Exhibit/Paper No. 0002; BJ's Wholesale Club Holdings, Inc.; "Petition for Inter Partes Review of U.S. Pat. No. 10,121,133"; USPTO Patent Trial and Appeal Board; Filing Date Sep. 29, 2022; pp. iii-vii and 1-83.

*BJ's Wholesale Club Holdings, Inc.* v. *Walmart Apollo, LLC*; AIA Review No. IPR2022-01471; Exhibit/Paper No. 0006; Walmart Apollo, LLC; "Patent Owner's Preliminary Response"; USPTO Patent Trial and Appeal Board; Filing Date Jan. 13, 2023; pp. i-v and 1-74.

*BJ's Wholesale Club Holdings, Inc.* v. *Walmart Apollo, LLC*; AIA Review No. IPR2022-01471; Exhibit/Paper No. 0007; USPTO Patent Trial and Appeal Board; "Denying Institution of Inter Partes Review 35 U.S.C. § 314"; USPTO Patent Trial and Appeal Board; Filing Date Apr. 12, 2023; 19 pages.

*BJ's Wholesale Club Holdings, Inc.* v. *Walmart Apollo, LLC*; AIA Review No. IPR2022-01471; Exhibit/Paper No. 1002; BJ's Wholesale Club Holdings, Inc.; "Declaration of Micheal I. Shamos, Ph.D", USPTO Patent Trial and Appeal Board; Filing Date Sep. 29, 2022; pp. i-iii and 1-130.

*BJ's Wholesale Club Holdings, Inc.* v. *Walmart Apollo, LLC*; AIA Review No. IPR2022-01471; Exhibit/Paper No. 2004; USPTO Patent Trial and Appeal Board; "Exhibit, Decision on Appeal in Ex Parte Burns"; USPTO Patent Trial and Appeal Board; Filing Date Jan. 13, 2023; 8 pages.

*BJ's Wholesale Club Holdings, Inc.* v. *Walmart Apollo, LLC*; AIA Review No. IPR2022-01528, IPR2022-01561, IPR2022-01563, IPR2022-01564; Exhibit/Paper No. 0007; BJ's Wholesale Club Holdings, Inc.; "Petitioner's Notice of Ranking Petitions for Inter Partes Review of U.S. Pat. No. 10,803,435"; USPTO Patent Trial and Appeal Board; Filing Date Oct. 17, 2022; pp. 1-6.

*BJ's Wholesale Club Holdings, Inc.* v. *Walmart Apollo, LLC*; AIA Review No. IPR2022-01528, IPR2022-01561, IPR2022-01563, IPR2022-01564; Exhibit/Paper No. 2002; Walmart Apollo, LLC; "Exhibit, Declaration of Matthew W. Johnson"; USPTO Patent Trial and Appeal Board; Filing Date Jan. 13, 2023; pp. 1-5.

*BJ's Wholesale Club Holdings, Inc.* v. *Walmart Apollo, LLC*; AIA Review No. IPR2022-01528, IPR2022-01561, IPR2022-01563, IPR2022-01564; Exhibit/Paper No. 2003; Walmart Apollo, LLC; "Exhibit, Claim 1 to Claim 15 Comparison"; USPTO Patent Trial and Appeal Board; Filing Date Jan. 13, 2023; pp. 1.

*BJ's Wholesale Club Holdings, Inc.* v. *Walmart Apollo, LLC*; AIA Review No. IPR2022-01528, IPR2022-01561, IPR2022-01563; Exhibit/Paper No. 0010; Walmart Apollo, LLC; "Patent Owner's Preliminary Sur-Reply"; USPTO Patent Trial and Appeal Board; Filing Date Feb. 22, 2023; pp. 1-8.

*BJ's Wholesale Club Holdings, Inc.* v. *Walmart Apollo, LLC*; AIA Review No. IPR2022-01528; Exhibit/Paper No. 0002; BJ's Wholesale Club Holdings, Inc.; "Petition for Inter Partes Review of U.S. Pat. No. 10,803,435"; USPTO Patent Trial and Appeal Board; Filing Date Sep. 22, 2022; pp. ii-viii and 1-72.

*BJ's Wholesale Club Holdings, Inc.* v. *Walmart Apollo, LLC*; AIA Review No. IPR2022-01528; Exhibit/Paper No. 0006; BJ's Wholesale Club Holdings, Inc.; "Petitioner's Updated Exhibit List"; USPTO Patent Trial and Appeal Board; Filing Date Oct. 17, 2022; pp. i-ii and 1-1.

*BJ's Wholesale Club Holdings, Inc.* v. *Walmart Apollo, LLC*; AIA Review No. IPR2022-01528; Exhibit/Paper No. 0008; Walmart Apollo, LLC; "Patent Owner's Preliminary Response"; USPTO Patent Trial and Appeal Board; Filing Date Jan. 13, 2023; pp. i-iv and 1-44.

*BJ's Wholesale Club Holdings, Inc.* v. *Walmart Apollo, LLC*; AIA Review No. IPR2022-01528; Exhibit/Paper No. 0009; BJ's Wholesale Club Holdings, Inc.; "Petitioner's Reply to Patent Owner Preliminary Response"; USPTO Patent Trial and Appeal Board; Filing Date Feb. 15, 2023; pp. 1-6.

*BJ's Wholesale Club Holdings, Inc.* v. *Walmart Apollo, LLC*; AIA Review No. IPR2022-01528; Exhibit/Paper No. 0011; USPTO Patent Trial and Appeal Board; "Institution Decision: Decision Granting Institution of Inter Partes Review 35 U.S.C. § 314"; USPTO Patent Trial and Appeal Board; Filing Date Apr. 12, 2023; pp. 2-35.

*BJ's Wholesale Club Holdings, Inc.* v. *Walmart Apollo, LLC*; AIA Review No. IPR2022-01528; Exhibit/Paper No. 0013; Walmart Apollo, LLC; "Patent Owner's Objections to Evidence"; USPTO Patent Trial and Appeal Board; Filing Date Apr. 24, 2023; pp. 1-5.

*BJ's Wholesale Club Holdings, Inc.* v. *Walmart Apollo, LLC*; AIA Review No. IPR2022-01528; Exhibit/Paper No. 0014; BJ's Wholesale Club Holdings, Inc.; "Objections to Patent Owner's Under 37 C.F.R. 42.64(b)(1) To Evidence Served", USPTO Patent Trial and Appeal Board; Filing Date Apr. 24, 2023; 3 pages.

*BJ's Wholesale Club Holdings, Inc.* v. *Walmart Apollo, LLC*; AIA Review No. IPR2022-01528; Exhibit/Paper No. 1002; BJ's Wholesale Club Holdings, Inc.; "Declaration of Michael Shamos, Ph.D"; USPTO Patent Trial and Appeal Board; Filing Date Sep. 22, 2022; pp. i-v and 1-118.

*BJ's Wholesale Club Holdings, Inc.* v. *Walmart Apollo, LLC*; AIA Review No. IPR2022-01561; Exhibit/Paper No. 0002; BJ's Wholesale Club Holdings, Inc.; "Petition for Inter Partes Review of U.S. Pat. No. 10,803,435"; USPTO Patent Trial and Appeal Board; Filing Date Sep. 29, 2022; pp. iii-ix and 1-66.

*BJ's Wholesale Club Holdings, Inc.* v. *Walmart Apollo, LLC*; AIA Review No. IPR2022-01561; Exhibit/Paper No. 0006; BJ's Wholesale Club Holdings, Inc.; "Petitioner's Updated Exhibit List"; USPTO Patent Trial and Appeal Board; Filing Date Oct. 17, 2023; pp. i-ii and 1-1.

*BJ's Wholesale Club Holdings, Inc.* v. *Walmart Apollo, LLC*; AIA Review No. IPR2022-01561; Exhibit/Paper No. 0008; Walmart Apollo, LLC; "Patent Owner's Preliminary Response"; USPTO Patent Trial and Appeal Board; Filing Date Jan. 13, 2023; pp. i-iii and 1-44.

(56) References Cited

OTHER PUBLICATIONS

*BJ's Wholesale Club Holdings, Inc.* v. *Walmart Apollo, LLC*; AIA Review No. IPR2022-01561; Exhibit/Paper No. 0009; BJ's Wholesale Club Holdings, Inc.; "Petitioner's Reply to Patent Owner Preliminary Response"; USPTO Patent Trial and Appeal Board; Filing Date Feb. 15, 2023; pp. 1-6.
*BJ's Wholesale Club Holdings, Inc.* v. *Walmart Apollo, LLC*; AIA Review No. IPR2022-01561; Exhibit/Paper No. 0011; USPTO Patent Trial and Appeal Board; "Institution Decision: Deny"; USPTO Patent Trial and Appeal Board; Filing Date Apr. 12, 2023; pp. 2-30.
*BJ's Wholesale Club Holdings, Inc.* v. *Walmart Apollo, LLC*; AIA Review No. IPR2022-01561; Exhibit/Paper No. 1002; Bj's Wholesale Club Holdings, Inc.; "Declaration of Michael Shamos, Ph.D"; USPTO Patent Trial and Appeal Board; Filing Date Sep. 22, 2022; pp. i-vi and 1-148.
*BJ's Wholesale Club Holdings, Inc.* v. *Walmart Apollo, LLC*; AIA Review No. IPR2022-01561; Exhibit/Paper No. 1026; BJ's Wholesale Club Holdings, Inc.; "Plaintiff's Preliminary Disclosure of Asserted Claims and Infringement Contentions to BJ's Wholesale Club Holdings, Inc."; USPTO Patent Trial and Appeal Board; Filing Date Oct. 17, 2022; pp. 1-7.
*BJ's Wholesale Club Holdings, Inc.* v. *Walmart Apollo, LLC*; AIA Review No. IPR2022-01563; Exhibit/Paper No. 0002; BJ's Wholesale Club Holdings, Inc.; "Petition for Inter Partes Review of U.S. Pat. No. 10,803,435"; USPTO Patent Trial and Appeal Board; Filing Date Sep. 22, 2022; pp. iii-viii and 1-50.
*BJ's Wholesale Club Holdings, Inc.* v. *Walmart Apollo, LLC*; AIA Review No. IPR2022-01563; Exhibit/Paper No. 0006; BJ's Wholesale Club Holdings, Inc.; "Petitioner's Updated Exhibit List"; USPTO Patent Trial and Appeal Board; Filing Date Oct. 17, 2022; pp. 1-3.
*BJ's Wholesale Club Holdings, Inc.* v. *Walmart Apollo, LLC*; AIA Review No. IPR2022-01563; Exhibit/Paper No. 0007; BJ's Wholesale Club Holdings, Inc.; "Petitioner's Notice of Ranking Petitions for Inter Partes Review of U.S. Pat. No. 10,803,435"; USPTO Patent Trial and Appeal Board; Filing Date Oct. 17, 2022; pp. 1-6.
*BJ's Wholesale Club Holdings, Inc.* v. *Walmart Apollo, LLC*; AIA Review No. IPR2022-01563; Exhibit/Paper No. 0008; Walmart Apollo, LLC; "Patent Owner's Preliminary Response"; USPTO Patent Trial and Appeal Board; Filing Date Jan. 13, 2023; pp. i-iii and 1-35.
*BJ's Wholesale Club Holdings, Inc.* v. *Walmart Apollo, LLC*; AIA Review No. IPR2022-01563; Exhibit/Paper No. 0009; BJ's Wholesale Club Holdings, Inc.; "Petitioner's Reply to Patent Owner Preliminary Response"; USPTO Patent Trial and Appeal Board; Filing Date Feb. 15, 2023; pp. 1-6.
*BJ's Wholesale Club Holdings, Inc.* v. *Walmart Apollo, LLC*; AIA Review No. IPR2022-01563; Exhibit/Paper No. 0011; USPTO Patent Trial and Appeal Board; "Institution Decision: Granting Institution of Inter Partes Review 35 U.S.C. § 314"; USPTO Patent Trial and Appeal Board; Filing Date Apr. 12, 2023; pp. 1-28.
*BJ's Wholesale Club Holdings, Inc.* v. *Walmart Apollo, LLC*; AIA Review No. IPR2022-01563; Exhibit/Paper No. 0013; Walmart Apollo, LLC; "Patent Owner's Objections Under 37 C.F.R. § 42.64(b)(1) to Evidence Served"; USPTO Patent Trial and Appeal Board; Filing Date Apr. 24, 2023; pp. 1-5.
*BJ's Wholesale Club Holdings, Inc.* v. *Walmart Apollo, LLC*; AIA Review No. IPR2022-01563; Exhibit/Paper No. 0014; BJ's Wholesale Club Holdings, Inc.; "Petitioner's Objections to Patent Owner's Evidence"; USPTO Patent Trial and Appeal Board; Filing Date Apr. 24, 2023; 3 pages.
*BJ's Wholesale Club Holdings, Inc.* v. *Walmart Apollo, LLC*; AIA Review No. IPR2022-01563; Exhibit/Paper No. 1002; Bj's Wholesale Club Holdings, Inc.; "Exhibit, Declaration of Michael I. Shamos, Ph.D."; USPTO Patent Trial and Appeal Board; Filing Date Sep. 22, 2022; pp. i-vi and 1-148.
*BJ's Wholesale Club Holdings, Inc.* v. *Walmart Apollo, LLC*; AIA Review No. IPR2022-01564; Exhibit/Paper No. 0002; BJ's Wholesale Club Holdings, Inc.; "Petition for Inter Partes Review of U.S. Pat. No. 10,803,435"; USPTO Patent Trial and Appeal Board; Filing Date Sep. 22, 2022; pp. i-vii and 1-75.
*BJ's Wholesale Club Holdings, Inc.* v. *Walmart Apollo, LLC*; AIA Review No. IPR2022-01564; Exhibit/Paper No. 0006; BJ's Wholesale Club Holdings, Inc.; "Petitioner's Updated Exhibit List"; USPTO Patent Trial and Appeal Board; Filing Date Oct. 17, 2022; pp. i-iii and 1.
*BJ's Wholesale Club Holdings, Inc.* v. *Walmart Apollo, LLC*; AIA Review No. IPR2022-01564; Exhibit/Paper No. 0008; Walmart Apollo, LLC; "Patent Owner's Preliminary Response"; USPTO Patent Trial and Appeal Board; Filing Date Jan. 13, 2023; pp. i-vi and 1-34.
*BJ's Wholesale Club Holdings, Inc.* v. *Walmart Apollo, LLC*; AIA Review No. IPR2022-01564; Exhibit/Paper No. 0009; USPTO Patent Trial and Appeal Board; "Institution Decision: Granting Institution of Inter Partes Review 35 U.S.C. § 314"; USPTO Patent Trial and Appeal Board; Filing Date Apr. 11, 2023; pp. 1-48.
*BJ's Wholesale Club Holdings, Inc.* v. *Walmart Apollo, LLC*; AIA Review No. IPR2022-01564; Exhibit/Paper No. 0012; BJ's Wholesale Club Holdings, Inc.; "Petitioner's Objections to Patent Owner's Evidence"; USPTO Patent Trial and Appeal Board; Filing Date Apr. 24, 2023; pp. 3 pages.
*BJ's Wholesale Club Holdings, Inc.* v. *Walmart Apollo, LLC*; AIA Review No. IPR2022-01564; Exhibit/Paper No. 1021; BJ's Wholesale Club Holdings, Inc.; "Yong English Annotated Drawings Figures 1-11"; USPTO Patent Trial and Appeal Board; Filing Date Sep. 22, 2022; pp. 1-7.
*BJ's Wholesale Club Holdings, Inc.* v. *Walmart Apollo, LLC*; AIA Review No. IPR2022-01564; Exhibit/Paper No. 1026; Walmart Apollo, LLC; "Plaintiff's Preliminary Disclosure of Asserted Claims and Infringement Contentions to BJ's Wholesale Club Holdings, Inc."; USPTO Patent Trial and Appeal Board; Filing Date Oct. 17, 2022; pp. 1-7.
Digipay.guru; "Scan & Thru Solution—Fast, Secure & Convenient | DigiPay.Guru"; <https://www.digipay.guru/scan-and-go-self-checkout-payment-solution/>; available at least as early as Dec. 12, 2022; pp. 1-26.
Emigh, Jacqueline et al; "Windows May be coming to Your Shopping Cart This Year" Betanews; Published Jan. 14, 2008; Accessed Aug. 12, 2010; http://www.betanews.comfWindows-may-be-coming-to-your-shopping-cart-this-year/1200339171.
Gao, Jerry, et al.; "A 2D Barcode-based Mobile Payment System"; 2009 Third International Conference on Multimedia and Ubiquitous Engineering; 2009; San Jose State University; San Jose; pp. 1-13.
Hhappe, Inc. Shop 'n Stock; "Grocery Shopping—A Whole New Way!" 2009-2010, Accessed Aug. 12, 2010; http://www.shop-n-stock.com; 3 pages.
IBM; IP.com No. IPCOM000139258D "System and Method for Retail Store Self Checkout via Cellular Phone Technology" Published Aug. 17, 2006; www.ip.com, 5 pages.
International Search Report and Written Opinion from related international patent application No. PCT/US2011/055984 (filed Oct. 21, 2011); 14 pages.
Lichtenstein, Nelson, "The Retail Revolution: How Wal-Mart Created a Brave New World of Business"; 2009; Henry Holt and Company; United States of America; 19 pages.
Merriam-Webster, Inc; "Webster's New College Dictionary"; 2007; Wiley Publishing, Inc.; Cleveland; 3 pages.
Merriam-Webster, Incorporated, "Merriam-Webster's Collegiate Dictionary", 2000; Tenth Edition; Merriam-Webster, Incorporated; 4 pages.
Microsoft, "Microsoft Computer Dictionary"; 2002; Fifth Edition; Microsoft Press; Redmond; pp. 1-3.
*Sam's West, Inc. and Walmart Apollo, LLC* v. *BJ's Wholesale Club Holdings, Inc.*; Document No. 001; Sam's West, Inc.; "Complaint and Demand for Jury Trial and Injunctive Relief with Exhibits"; United States District Court for the Middle District of Florida, Orlando Division; Case No. 6:22-cv-00587; Mar. 22, 2022; 247 pages.
*Sam's West, Inc. and Walmart Apollo, LLC* v. *BJ's Wholesale Club Holdings, Inc.*; Document No. 035; BJ's Wholesale Club Holdings, Inc.; "Defendant BJ's Wholesale Club Holdings, Inc.'s Motion to

(56) References Cited

OTHER PUBLICATIONS

Dismiss, with Appendix"; United States District Court for the Middle District of Florida, Orlando Division; Case No. 6:22-cv-00587; Apr. 29, 2022; 30 pages.
*Sam's West, Inc. and Walmart Apollo, LLC* v. *BJ's Wholesale Club Holdings, Inc.*; Document No. 036; Sam's West, Inc.; "Plaintiffs' Response to Defendant's Motion to Dismiss Under Rule 12(b)(6)"; United States District Court for the Middle District of Florida, Orlando Division; Case No. 6:22-cv-00587; May 20, 2022; pp. 1-20.
*Sam's West, Inc. and Walmart Apollo, LLC* v. *BJ's Wholesale Club Holdings, Inc.*; Document No. 037-01; Sam's West, Inc.; "Proposed First Amended Complaint and Demand for Jury Trial and Injunctive Relief", United States District Court for the Middle District of Florida, Orlando Division; Case No. 6:22-cv-00587; May 23, 2022; pp. 1-71.
*Sam's West, Inc. and Walmart Apollo, LLC* v. *BJ's Wholesale Club Holdings, Inc.*; Document No. 037-06; Sam's West, Inc.; "Exhibit 5"; United States District Court for the Middle District of Florida, Orlando Division; Case No. 6:22-cv-00587; May 23, 2022; pp. 1-33.
*Sam's West, Inc. and Walmart Apollo, LLC* v. *BJ's Wholesale Club Holdings, Inc.*; Document No. 037-07; Sam's West, Inc.; "Exhibit 6"; United States District Court for the Middle District of Florida, Orlando Division; Case No. 6:22-cv-00587; May 23, 2022; pp. 1-22.
*Sam's West, Inc. and Walmart Apollo, LLC* v. *BJ's Wholesale Club Holdings, Inc.*; Document No. 037-08; Sam's West, Inc.; "Exhibit 7"; United States District Court for the Middle District of Florida, Orlando Division; Case No. 6:22-cv-00587; May 23, 2022; pp. 1-13.
*Sam's West, Inc. and Walmart Apollo, LLC* v. *BJ's Wholesale Club Holdings, Inc.*; Document No. 037-09; Sam's West, Inc.; "Exhibit 8"; United States District Court for the Middle District of Florida, Orlando Division; Case No. 6:22-cv-00587; May 23, 2022; pp. 1-14.
*Sam's West, Inc. and Walmart Apollo, LLC* v. *BJ's Wholesale Club Holdings, Inc.*; Document No. 049; Baker, Magistrate Judge David A.; "Order Denying as Moot 35 Motion to Dismiss for Failure to State a Claim; Granting 37 Motion to Amend Complaint; Denying as Moot 39 Motion for Leave to File a Reply Memorandum in Support of Motion to Dismiss"; United States District Court for the Middle District of Florida, Orlando Division; Case No. 6:22-cv-00587; Jun. 8, 2022; pp. 1-3.
*Sam's West, Inc. and Walmart Apollo, LLC* v. *BJ's Wholesale Club Holdings, Inc.*; Document No. 054; BJ's Wholesale Club Holdings, Inc.; "Defendant BJ's Wholesale Club Holdings, Inc.'s Motion to Dismiss"; United States District Court for the Middle District of Florida, Orlando Division; Case No. 6:22-cv-00587; Jun. 27, 2022; pp. 1-27.
*Sam's West, Inc. and Walmart Apollo, LLC* v. *BJ's Wholesale Club Holdings, Inc.*; Document No. 062; Sam's West, Inc.; "Plaintiffs' Response to Defendant's Motion to Dismiss Under Rule 12(B)(6)"; United States District Court for the Middle District of Florida, Orlando Division: Case No. 6:22-cv-00587; Jul. 18, 2022; pp. 1-21.
*Sam's West, Inc. and Walmart Apollo, LLC* v. *BJ's Wholesale Club Holdings, Inc.*; Document No. 067; BJ's Wholesale Club Holdings, Inc.; "Defendant BJ's Wholesale Club Holdings, Inc.'s Reply in Support of its Motion to Dismiss"; United States District Court for the Middle District of Florida, Orlando Division; Case No. 6:22-cv-00587; Aug. 5, 2022; pp. 1-7.
*Sam's West, Inc. and Walmart Apollo, LLC* v. *BJ's Wholesale Club Holdings, Inc.*; Document No. 078; Sam's West, Inc. "Plaintiffs' Statement Regarding Defendant's IPR Petitions Pursuant to Court's Notice of Hearing"; United States District Court for the Middle District of Florida, Orlando Division; Case No. 6:22-cv-00587; Sep. 7, 2022; pp. 1-10.
*Sam's West, Inc. and Walmart Apollo, LLC* v. *BJ's Wholesale Club Holdings, Inc.*; Document No. 079; BJ's Wholesale Club Holdings, Inc. "Defendant BJ's Wholesale Club Holdings, Inc.'s Statement Pursuant to Sep. 1, 2022 Order, with Exhibit"; United States District Court for the Middle District of Florida, Orlando Division; Case No. 6:22-cv-00587; Sep. 7, 2022; 21 pages.
*Sam's West, Inc. and Walmart Apollo, LLC* v. *BJ's Wholesale Club Holdings, Inc.*; Document No. 083; Sam's West, Inc.; "Corrected First Amended Complaint and Demand for Jury Trial and Injunctive Relief"; United States District Court for the Middle District of Florida, Orlando Division; Case No. 6:22-cv-00587; Sep. 19, 2022; pp. 1-72.
*Sam's West, Inc. and Walmart Apollo, LLC* v. *BJ's Wholesale Club Holdings, Inc.*; Document No. 085; Sam's West, Inc.; "Plaintiffs' Short Form Motion to Compel Responses to Interrogatory Nos. 2, 5, 6, and 11, with Exhibits"; United States District Court for the Middle District of Florida, Orlando Division; Case No. 6:22-cv-00587; Sep. 22, 2022; 48 pages.
*Sam's West, Inc. and Walmart Apollo, LLC* v. *BJ's Wholesale Club Holdings, Inc.*; Document No. 088; Sam's West, Inc. and BJ's Wholesale Club Holdings, Inc.; "Joint Claim Construction Statement, with Exhibit"; United States District Court for the Middle District of Florida, Orlando Division; Case No. 6:22-cv-00587; Sep. 23, 2022; 6 pages.
*Sam's West, Inc. and Walmart Apollo, LLC* v. *BJ's Wholesale Club Holdings, Inc.*; Document No. 091; BJ's Wholesale Club Holdings, Inc.; "Defendant BJ's Wholesale Club Holdings, Inc.'s Motion to Stay Proceedings Pending Inter Partes Review"; United States District Court for the Middle District of Florida, Orlando Division; Case No. 6:22-cv-00587; Sep. 26, 2022; pp. 1-19.
*Sam's West, Inc. and Walmart Apollo, LLC* v. *BJ's Wholesale Club Holdings, Inc.*; Document No. 094; BJ's Wholesale Club Holdings, Inc.; "Defendant BJ's Wholesale Club Holdings, Inc.'s Opposition to Plaintiffs' Short Form Motion to Compel, with Exhibits"; United States District Court for the Middle District of Florida, Orlando Division; Case No. 6:22-cv-00587; Sep. 29, 2022; 85 pages.
*Sam's West, Inc. and Walmart Apollo, LLC* v. *BJ's Wholesale Club Holdings, Inc.*; Document No. 096; Sam's West, Inc.; "Plaintiffs' Response to Defendant BJ's Wholesale Club Holdings, Inc.'s Motion to Stay Proceedings Pending Inter Partes Review, with Exhibits", United States District Court for the Middle District of Florida, Orlando Division; Case No. 6:22-cv-00587; Oct. 11, 2022; 60 pages.
*Sam's West, Inc. and Walmart Apollo, LLC* v. *BJ's Wholesale Club Holdings, Inc.*; Document No. 101; Chao-Lee Lin, Joel; "Declaration of Joel Chao-Lee Lin in Support of Plaintiffs' Claim Construction Brief"; United States District Court for the Middle District of Florida, Orlando Division; Case No. 6:22-cv-00587; Oct. 21, 2022; pp. 1-4.
*Sam's West, Inc. and Walmart Apollo, LLC* v. *BJ's Wholesale Club Holdings, Inc.*; Document No. 102; Sam's West, Inc.; "Plaintiffs' Claim Construction Brief"; United States District Court for the Middle District of Florida, Orlando Division; Case No. 6:22-cv-00587; Oct. 21, 2022; pp. 1-27.
*Sam's West, Inc. and Walmart Apollo, LLC* v. *BJ's Wholesale Club Holdings, Inc.*; Document No. 108; Baker, Magistrate Judge David A.; "Order Granting in Part and Denying in Part 91 Motion to Stay"; United States District Court for the Middle District of Florida, Orlando Division; Case No. 6:22-cv-00587; Nov. 21, 2022; pp. 1-17.
*Sam's West, Inc. and Walmart Apollo, LLC* v. *BJ's Wholesale Club Holdings, Inc.*; Document No. 112; BJ's Wholesale Club Holdings, Inc.; "Defendant BJ's Wholesale Club Holdings, Inc.'s Responsive Claim Construction Brief"; United States District Court for the Middle District of Florida, Orlando Division; Case No. 6:22-cv-00587; Nov. 21, 2022; pp. 1-24.
*Sam's West, Inc. and Walmart Apollo, LLC* v. *BJ's Wholesale Club Holdings, Inc.*; Document No. 114; Baker, Magistrate Judge David A.; "Order Denying Without Prejudice 54 Motion to Dismiss; adopting 109 Report and Recommendations"; United States District Court for the Middle District of Florida, Orlando Division; Case No. 6:22-cv-00587; Feb. 2, 2023; pp. 1-2.
Schematic "Stop & Shop: Scan It!—Elevating Interactivity" Published Jan. 27, 2010; Accessed Aug. 12, 2010 http://touch.schematic.com/2010/01/stop-shop-scan-it/; 10 pages.

(56) References Cited

OTHER PUBLICATIONS

SN Staff; Supermarket News Kroger Store Deploys Tunnel Scanners' at Checkout; Published Jul. 21, 2010; Accessed Nov. 17, 2010 http://supermarketnews.com/news/tunnel_scanner_0721/; 2 pages.
Truta, Filip; "AisleBuyer Announces Self-Checkout iPhone Application"; <https://news.softpedia.com/news/ AisleBuyer-Announces-Self-Checkout-iPhone-Application-152569 .shtml>; Aug. 17, 2010; pp. 1-2.
USPTO; U.S. Appl. No. 12/947,545; Notice of Allowance mailed Jan. 18, 2018; 11 pages.
USPTO; U.S. Appl. No. 12/947,545; Notice of Allowance mailed Feb. 8, 2018; 4 pages.
USPTO; U.S. Appl. No. 12/947,545; Notice of Allowance mailed Jun. 25, 2018; 10 pages.
USPTO; U.S. Appl. No. 12/947,545; Office Action mailed Jan. 13, 2017; 23 pages.
USPTO; U.S. Appl. No. 12/947,545; Office Action mailed Jan. 15, 2016; 19 pages.
USPTO; U.S. Appl. No. 12/947,545; Office Action mailed Mar. 9, 2012; 9 pages.
USPTO; U.S. Appl. No. 12/947,545; Office Action mailed Mar. 26, 2015; 14 pages.
USPTO; U.S. Appl. No. 12/947,545; Office Action mailed Jun. 30, 2014; 14 pages.
USPTO; U.S. Appl. No. 12/947,545; Office Action mailed Jul. 10, 2015; 16 pages.
USPTO; U.S. Appl. No. 12/947,545; Office Action mailed Aug. 25, 2016; 17 pages.
USPTO; U.S. Appl. No. 12/947,545; Office Action mailed Sep. 25, 2012; 11 pages.
USPTO; U.S. Appl. No. 12/947,545; Office Action mailed Nov. 21, 2013; 11 pages.
USPTO; U.S. Appl. No. 16/730,567; Notice of Allowance mailed Aug. 6, 2020.
USPTO; U.S. Appl. No. 16/730,567; Office Action mailed Apr. 17, 2020; 10 pages.
USPTO; U.S. Appl. No. 17/004,819; Non-Final Rejection mailed Nov. 22, 2022; (pp. 1-9).
USPTO; U.S. Appl. No. 17/004,819; Notice of Allowance and Fees Due (PTOL-85) mailed Aug. 4, 2023; (pp. 1-10).
Walsh, Mark; "Target Teams With Shop kick" MediaPost Blogs; Published Nov. 16, 2010; Accessed Nov. 17, 2010; http://mediapost.com/publicationsf?fa=Articles.showArticle&art_aid=13961 0. (pp. 1-2).

* cited by examiner

SYSTEMS AND METHODS OF CONTROLLING DEVICES IN IMPLEMENTING MULTI-SESSION RETAIL PURCHASES

BACKGROUND

Retail entities often provide customers with multiple ways to purchase items. The ability to use one or more of these ways of purchasing can simplify shopping and purchasing items for many customers. There is a need to further enhance retail shopping and/or purchasing.

BRIEF DESCRIPTION OF DRAWINGS

Disclosed herein are embodiments of systems, apparatuses and methods pertaining to purchasing through customer devices. This description includes drawings, wherein.

Figure 1:
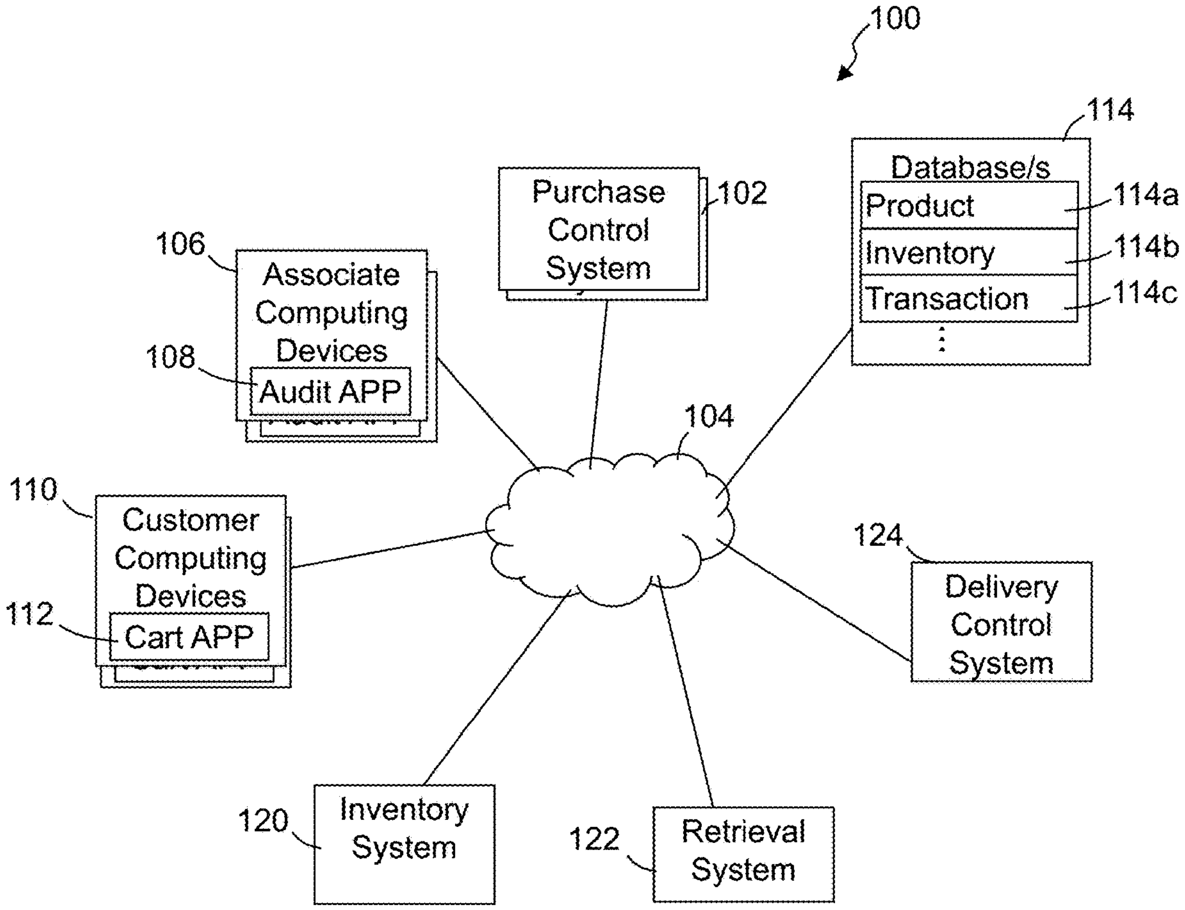
FIG. 1 illustrates a simplified block diagram of an exemplary purchase enabling system that can control mobile devices in enabling purchasing of items at a retail facility, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments enable customers, while at a retail facility, to select items they intend to purchase during a purchase session as they move through the retail facility, and using a mobile computing device to identify the items and incorporate those items into a virtual cart. Through an application executed on the computing device, the customer can further complete a purchase of the items incorporated into the virtual cart during that session. It has been identified, however, that it can be further beneficial to enable a customer to further purchase one or more additional items through the mobile device without the customer having to leave the retail facility (i.e., enabling subsequent purchase sessions without having to exit and reenter the retail facility). Accordingly, some embodiments provide systems that computing devices through communications over a distributed communication network to enable the initiation of one or more subsequent additional purchase sessions to purchase one or more additional products associated with one of those additional sessions. Still further, the multiple sessions associated with a single customer can be linked as a single transaction enabling a subsequent confirmation that items each of the separate sessions during a single audit process, which may or may not be completed without increasing communication bandwidth and/or introducing additional undesirable delay.

FIG. 1 illustrates a simplified block diagram of an exemplary purchase enabling system 100 that can control mobile devices in enabling purchasing of items at a retail facility, in accordance with some embodiments. The purchase enabling system 100 can include one or more purchase control systems 102 that can be implemented through one or more purchase control circuits and/or processors, and can be communicatively coupled with one or more distributed computer and/or communications networks 104 (e.g., Internet, cellular network, Wi-Fi network, Bluetooth network, local area network (LAN), wide area network (WAN), other such communications and/or computing networks, or a combination of two or more of such networks). In some implementations, the purchase control circuits can be distributed and/or geographically distributed over the distributed communications network 104, which can enable distributed processing, redundancy and/or other such benefits. The purchase enabling system 100 can further include and/or be in communication with one or more retail associate computing devices 106, which can include one or more associate device control circuits and memory, each can be configured to execute one or more applications (APPs), including but not limited to an exit audit application (APP)

108 that in part controls the associate computing devices 106 in confirming and/or finalizing some purchases.

Further, the one or more purchase control systems 102 can be in communication over the one or more communications networks 104 with customer computing devices 110, each associated with a respective customer and temporarily at the retail facility as the customers are at one of the retail facilities shopping for items to purchase. At least some of the customer computing devices can store and execute one or more customer applications (APPs), including but not limited to a cart compile and/or self-purchase application (APP) 112. The cart compile APP 112 enables the customer to identify, through the customer computing device 110 one or more items intended to be purchased, and in some instances complete a purchase of the one or more items identified. Such identification of items for purchase can be identified through one or more methods and/or techniques, such as but not limited to selection from a listing of one or more items displayed on the computing device, image recognition of an item, optical scanning of a unique optically scannable identifier (e.g., barcode, QR code, etc.), optical character recognition (OCR), other such methods or a combination of two or more of such methods. For example, the item recognition can be achieved through one or more methods as described in one or more of U.S. Pat. No. 10,121,133 entitled Method For Self-Checkout With A Mobile Device; U.S. Pat. No. 10,872,326 entitled Systems And Methods Of Product Recognition Through Multi-Model Image Processing; and U.S. Pat. No. 11,263,682 entitled System And Method For Coupling A User Computing Device And A Point Of Sale Device; each of which is incorporated herein by reference in its entirety.

The purchase enabling system 100, in some embodiments, further includes and/or is in communication with one or more databases 114 that store various information. Such databases can include but are not limited one or more product databases 114*a* of the retail entity, one or more inventory databases 114*b* of the retail entity, one or more transaction databases 114*c*, one or more delivery resource databases, one or more application programming interface (API) databases storing multiple different APIs, other such databases, or a combination of two or more of such databases. In some embodiments the product database 114*a* includes one or more product computer storage and/or memory systems communicatively coupled with the distributed communication network 104 and stores product information comprising product identifying information for a plurality of different products, and sets of product characteristics information each corresponding to a respective one of the plurality of different products. The product characteristic information can include, for example, size information, dimensions information, weight information, ingredient information, color information, quantity information, purchase restriction information (e.g., age restriction, prescription requirement information, quantity restriction, legal restrictions, and/or other such restriction information), handling restrictions and/or instructions information, pricing information, related products information (e.g., pairing, relevance to, use with, often purchased with, etc.), other such information, or typically a combination of two or more of such information.

One or more inventory databases 114*b* of the retail entity, in some embodiments, comprise one or more inventory computer storage and/or memory systems communicatively coupled with the communication network 104 and store product quantity information at one or more locations and/or storage locations corresponding to each of at least a subset of the plurality of different products that are available from a respective one of each of multiple different retail facilities and/or locations. The inventory information, in some embodiments, may include pricing, shipment data, demand data, other such information, or a combination of such information relative to one or more of the products.

The transaction databases 114*c*, in some embodiments, in some embodiments, comprise one or more transaction computer storage and/or memory systems communicatively coupled with the communication network 104, that can be configured to maintain transaction information about multiple different pending and/or completed purchase transactions between different customers and one or more retail entities. The transaction information can include but is not limited state and/or status information about transactions, customer identifying information of a respective customer implementing or that implemented the transaction, products identifying information associated with respective transactions, transaction identifier information, whether the transaction is a multi-session transaction, number of pending, completed and/or aborted purchase sessions linked to a transaction, session identification information, error information, other such information, or a combination of two or more of such information.

Other databases can include, for example, one or more delivery resource databases can maintain information about, but not limited to, delivery vehicles relative to one or more locations and/or facilities, delivery scheduling relative to one or more locations and/or facilities, resource capabilities and/or availabilities (e.g., expected and/or maximum product movement rates, product storage capabilities and/or availabilities, predicted future capabilities and/or availabilities (e.g., based on up coming events, holidays, associate availabilities, etc.), other such factors, or a combination of two or more of such factors) relative to one or more locations and/or facilities, other such information or a combination of two or more of such information. Other databases may be included and/or accessible to the retail purchase enabling system 100.

The purchase enabling system 100 can further includes and/or be in communication with one or more point of sale (POS) systems 116. The POS systems 116 can include, but are not limited to, associate operated point of sale (POS) systems operated by an associate employee of the retail facility, self-checkout point of sale (POS) systems that enable customers to scan and pay for items, and/or other such point of sale systems. The POS systems typically include and/or are in communication with one or more scanning systems (e.g., barcode scanners, QR code scanners, RFID scanners, etc.) and/or other sensors systems (e.g., scales, optical sensors, imaging systems, etc.), from which the POS system can receive item information about items being purchased.

The purchase enabling system 100, in some embodiments, can include and/or be in communication with an inventory system 120 that can track inventory levels to provide information to customers, associates and other systems. In some implementations the inventory system can initiate orders and/or shipments for additional items at one or more retail facilities, direct the restocking of shelves and/or displays of one or more retail facilities, track item demand, other such functions, and typically a combination of two or more of such functionality. Some embodiments further include and/or are in communication with one or more item retrieval systems 122 at one or more retail facilities that can receive item information based on purchases and/or orders of respective items, and control the retrieval of the one or more items from one or more retail facilities. Such retrieval may be in preparation for product delivery, product pickup or other method of providing a purchased product to a user. In some embodiments, the product retrieval system 122 can include and/or be in communication with one or more robotic retrieval devices, associate computing devices 106, conveyor systems, packaging systems, item route control systems, other such systems, and typically a combination of two or more of such systems that can cooperatively be controlled to retrieve products for restocking and/or to provide to customers (e.g., directly within a retail facility, routed to a pickup location, and/or delivered to one or more locations). Some embodiments further include and/or are in communication with one or more delivery control systems 124 each associated with one or more retail facilities from which products can be retrieved and delivered. The delivery control systems 124, at least in part, can be configured to schedule and manage product deliveries for restocking, for other facilities and/or for customers. In some implementations, for example, the delivery control system coordinates deliveries based on locations and allocates the collection of products to one or more particular vehicles, in part, in attempts to focus delivery routes and reduce travel times between deliveries. Other such factors can be taken into account by the delivery control systems 124 to manage delivery and control delivery systems and/or vehicles (e.g., trucks, vans, drones, third party delivery services, etc.).

Still referring to FIG. 1, the purchase enabling system 100 is configured to enable customers to select items intended to be purchased, populate a virtual cart based on the items, and in some instances complete a purchase of one or more of those items through their respective customer computing devices 110. Such customer computing devices can be substantially any relevant computing device, and often are portable computing devices. The customer computing devices 110 can include but are not limited to smartphones, tablets, personal wearable systems (watches, glasses, etc.), laptops, desktop computers, gaming systems, and other such systems. Using the customer computing device, the respective customer can incorporate one or more products into a virtual shopping cart as the customer moves through a retail facility selecting items to purchase. Additionally or alternatively, in some implementations the customer may select one or more items presented in one or more listings and/or displayed representations of items to be purchased. Such items may be picked up by the customer (e.g., at a predefined location in the shopping facility), delivered to the customer as the customer leaves the facility, delivered to the customer's vehicle, delivered to a specified delivery location (e.g., customer's home or office), and/or otherwise provide the item to the customer. As introduced above, the incorporation into the virtual cart can be through an identification of the item using the customer computing device 110 (e.g., barcode scanning using image recognition, OCR, image processing to identify patterns and/or shapes, other such methods, or a combination of two or more of such methods).

In some implementations, the customer can complete the purchase of the one or more items directly through the cart compile APP 112. Additionally or alternatively, the customer may take advantage of a point of sale (POS) system operated by an associate employee of the retail facility, a self-checkout point of sale (POS) system to complete the purchase of the one or more items, and/or other such method. When completing through the cart compile APP 112, some items may have purchase restriction conditions that are to be evaluated and/or satisfied before the sale of at least that item. For example, some items have age restriction conditions that are to be met prior to a sale of that item being finalized and/or before the customer can take the item from the retail facility. Other restriction conditions can include, but are not limited to a confirmation of identification of the customer (e.g., prescription medicines, pre-ordered items, items exceeding a particular value, etc.), safety object removal restriction condition to remove one or more objects from an item (e.g., theft prevention object), other such restriction conditions or a combination of two or more of such restriction conditions. Still further, in some instances and/or at some retail facilities, the customer may be subject to a checkout or exit audit by one or more retail facility associate (e.g., an employee of the retail facility, an automated audit system (e.g., include multiple RFID tag readers and/or scanners), or other such associate). In some embodiments, the associate can utilize one or more associate computing devices 106, which can identify items, obtain information about products purchased, obtain customer information, and/or other such actions. Based on this information the associate computing device 106 and/or the associate operating the associate computing device can confirm purchases, finalize and complete purchase transactions (e.g., following the confirmation of satisfying one or more restriction conditions, determine that items have been identified in a virtual cart, and/or other such conditions), confirming payment method, and/or other such actions.

The purchase enabling system 100, in some embodiments, beneficially enables customers to establish multiple different purchase sessions in performing shopping. As one non-limiting example, a customer may complete the purchase of a first set of one or more items, and then realize that they want to purchase one or more additional items. As another non-limiting example, a customer may want to purchase a first set of one or more items using a first payment method, and purchase one or more other sets of one or more items using one or more different payment methods. Accordingly, some embodiments enable the implementation of multiple purchase sessions that allow the customer to purchase items, use different payment methods, other such actions where it may be beneficial to group one or more items, or a combination of two or more such actions.

The purchase control system 102, implemented through one or more purchase control circuits, can be configured to receive a session notification to initiate an additional purchase session from a customer computing device 110, which is associated with a particular customer. Again, in some implementations, the customer computing device 110 may be executing a cart compile APP 112 that provides the session notification. The session notification to initiate an additional purchase session may be received in response to an activation by the customer of an additional purchase option provided on a confirmation user interface and/or other user interface displayed on the customer computing device 110. Further, in some instances, the addition purchase session option my be presented in association with a first purchase session where the customer has identified a first set of one or more items to purchase relative to that first purchase session, such as in response to selecting a checkout option designating a completion and desire to purchase the items corresponding to a first virtual cart, a selection of an additional purchase session option when customer desires to use a different method of payment for one or more items, and/or other such instances where a customer may desire to initiate a separate purchase session. As one non-limiting example, the customer may build a first virtual cart by scanning one or more items using the customer computing device 110, and select a check-out option and designate a payment method for those items in completing the sale of the one or more items. Subsequent to the check-out the customer may identify one or more additional items to purchase, and select through a user interface displayed by the cart compile APP 112 (e.g., selection of a "Purchase More Items" option displayed on a purchase confirmation user interface presented to the customer in response to completing a check-out through the cart compile APP 112).

Figure 2A:
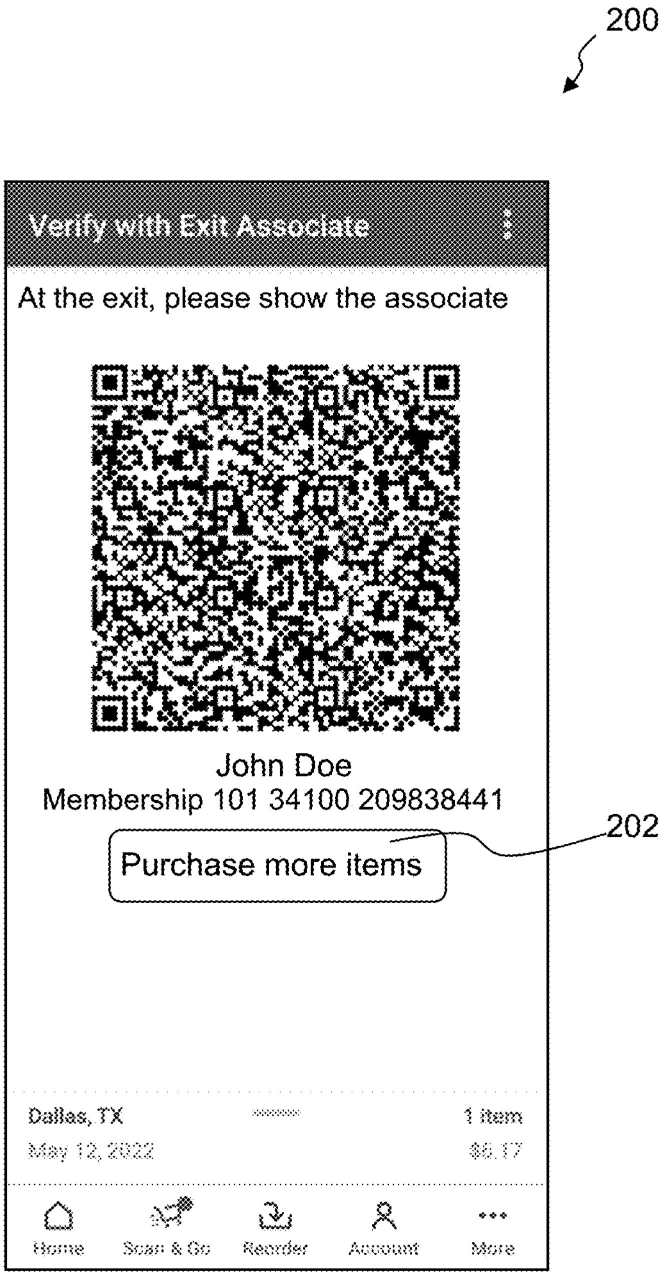
FIG. 2A illustrates a simplified graphical representation of an exemplary purchase confirmation user interface, in accordance with some embodiments.

FIG. 2A illustrates a simplified graphical representation of an exemplary purchase confirmation user interface 200, in accordance with some embodiments. The purchase confirmation user interface 200 can confirm a purchase, and can further include an option, such as a "Purchase more items" option 202, a "Create new session" option, "Start new cart" option, or other such option, that can be activated by the customer to initiate a subsequent purchase session. Based on the detection of the selection of the purchase more option 202, the cart compile APP 112 may generate and communicate the session notification to the purchase control system. The same or a similar option may be provided in other user interfaces provided through the cart compile APP and/or the exit audit APP that can cause the initiation of an additional session. For example, a receipt user interface showing a graphical representation of a receipt for the purchase of one or more items may include a similar option to activate an additional session and enable the customer to purchase additional items.

In response to the session notification, the purchase control system 102 can establish a second purchase session. In some embodiments, the purchase control system 102 identifies a customer with which the second purchase session is to be established, such as based on the cart compile APP 112 providing customer identifying information, customer computing device identifying information, previous session identifying information, other such identifying information, or a combination of two or more of such identifying information. The purchase control system 102 can utilize the identifying information to confirm that a previous session was established and associated with the customer. Further, in some embodiments, the purchase control system 102 and/or cart compile APP 112 link the second purchase session with the first purchase session. Still further, the linking between the first purchase session and the second purchase session in some embodiments provides an associated single purchase transaction linking the first purchase session and the second purchase session. In instances where the first purchase session is already linked as a single transaction with one or more additional purchase sessions, the second purchase session is further linked to the single transaction linking the second purchase session with the first purchase session as well as the one or more additional purchase sessions. As such, some embodiments enables the linking of two or more purchase sessions, and in some instances are linked as a single transaction. In some implementations, the first purchase session is already linked to the single purchase transaction prior to the establishing of the second purchase session (e.g., the single transaction is established at the time the first purchase session is initiated and linked with the single transaction). In other instances, the single transaction is established in response to the session notification, and both the first and second purchase sessions are linked to the single transaction. The association of the multiple purchase sessions as a single transaction enables the multiple purchased sessions to be cooperatively identified. For example, in some implementations, the transaction is assigned a transaction identifier that is associated with respective session identifiers for each of the linked purchase sessions. As such, the single transaction identifier can be used as reference to the multiple sessions.

A second virtual cart can be initiated for the second purchase session with the second virtual cart considered separate and different than the first virtual cart corresponding to the first purchase session. In some implementations, the purchase control system 102 directs the cart compile APP 112 to initiate the second virtual cart within the cart compile APP 112 and enables the customer to identify one or more additional items to be incorporated into the second virtual cart. In some embodiments, the cart compile APP 112 can add one or more items to the second virtual cart and maintains the second virtual cart local on the customer computing device. Cart information can periodically be communicated to the purchase control circuit and/or at the time of completing the purchase of the items added to the second virtual cart. In other implementations, the cart compile APP 112 can communicate item identifying information for each item identified to be purchased, and the purchase control system incorporates the item identifying information into the second virtual cart, with cart information being provided to the customer computing device to display the update to the second virtual cart. As such, the item identifying information can be incorporate into a second virtual cart, associated with the second purchase session, for each of one or more items identified, through the customer computing device 110, by the customer and intended to be purchased by the customer in association with the second purchase session.

Based on the linking of the multiple purchase sessions (e.g., first purchase session and the second purchase session) as a single transaction, the purchase control system 102 can establish transaction identifying information that corresponds to each of the multiple linked purchase sessions. Similarly, as introduced above, in some implementations, the purchases implemented by the customer through the cart compile APP 112 are confirmed and/or audited, such as audited by one or more associates of the retail facility prior to the customer leaving the retail facility with purchased items. In some embodiments, the purchase control system 102 can cause a final authentication of the single transaction in authenticating at a single time both the first session and the second session, instead of having an authentication of the first session and separately causing an authentication of the second session as separate acts. The single transaction enables the confirmation of purchase of any item of the multiple items from any of the multiple purchase sessions linked to the single transaction. This can increase the speed of the audit while still providing level of security and/or theft prevention, and in some instances prevents a check-out audit of a multiple session transaction from being longer that a single session transaction check-out audit, when audit does not result in issues, error and/or other factors that have to be addressed prior to completing the check-out audit.

In some embodiments, the check-out audit is simplified through the use of a single transaction identification that enables an associate computing device 106 being used as part of the check-out audit to quickly and easily access purchase session information for each purchase session linked as part of the single transaction. In some instances, this can include the customer computing device 110 displaying transaction identifying information that can be used by an associate computing device 106 to access the transaction information, including information for each of the multiple purchase sessions linked as the single transaction. The purchase control circuit can be configured, in some embodiments, to communicate transaction information to the customer computing device 110 with information from each of the multiple purchase sessions of the single transaction (e.g., information corresponding to both of the first purchase session and the second purchase session). Further, this information can control the customer computing device 110 in displaying a single transaction optical machine-readable representation corresponding to the single transaction. Such machine-readable representations can be a quick response (QR) or matrix code, barcode, string of alphanumeric and/or symbol characters, other such machine-readable codes, or a combination of two or more of such codes. The single optical machine-readable representation can encode dynamically generated unique session identifiers of each purchase session linked to the single transaction. For example, the single optical machine-readable representation can include a first unique session identifier corresponding to the first purchase session and a second unique session identifier corresponding to the second purchase session, when the single transaction links the first purchase session and the second purchase session. Typically, the unique session identifiers are generated by the purchase control system 102. In other instances, however, the unique session identifiers may be generated by the cart compile APP 112 (e.g., in response to detecting an activation or selection of a "Purchase More Items" option).

Figure 2B:
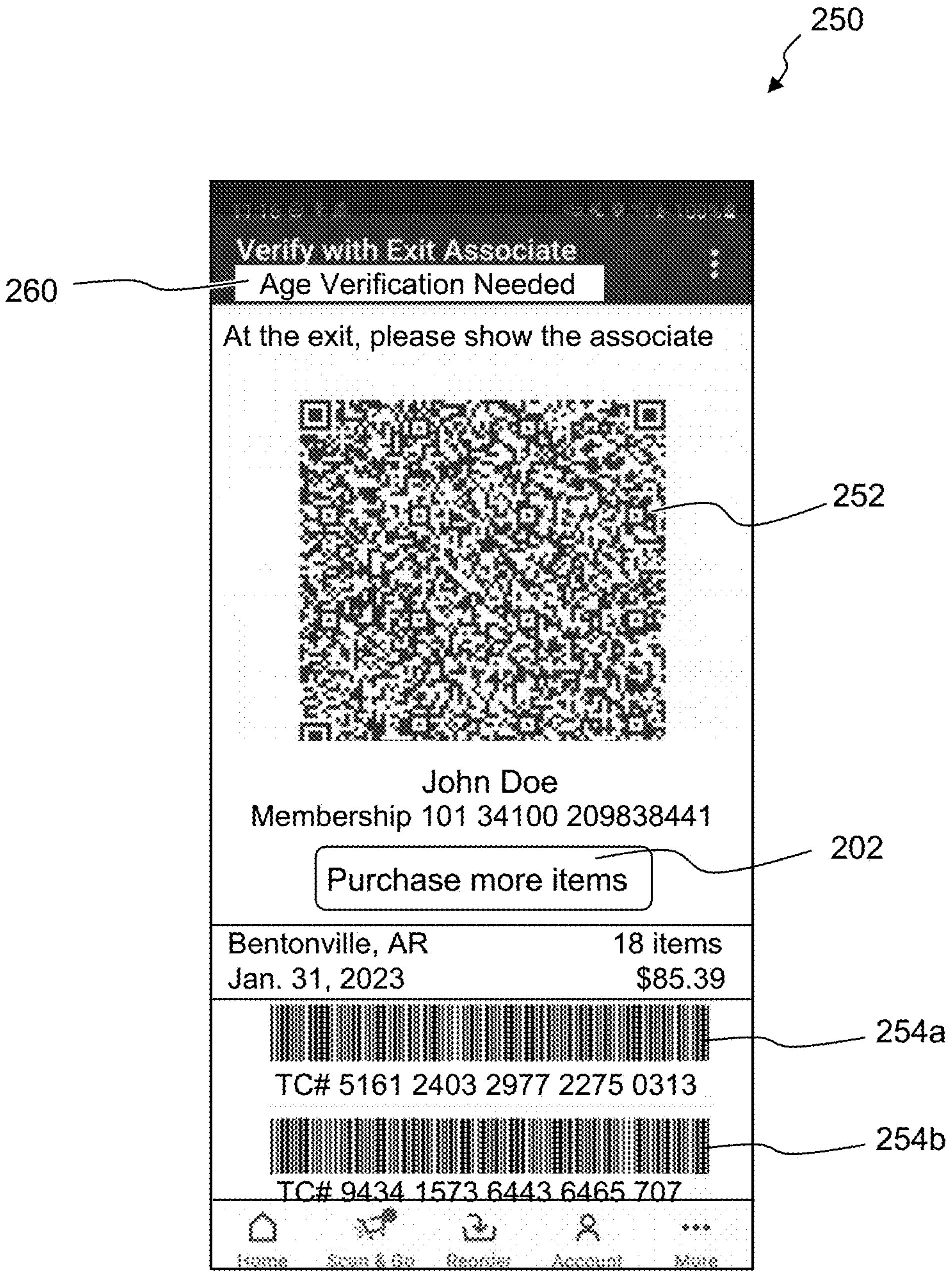
FIG. 2B illustrates a simplified graphical representation of an exemplary purchase confirmation user interface, in accordance with some embodiments.

FIG. 2B illustrates a simplified graphical representation of an exemplary purchase confirmation user interface 250 in accordance with some embodiments. The purchase confirmation user interface can confirm a purchase, with the exemplary option 202 to initiate a subsequent purchase session, and an exemplary single optical machine-readable representation 252 corresponding to the single transaction. The purchase confirmation user interface 250 can further indicate the optical machine-readable representation 252 corresponds to a multi-session transaction, such as a "Multi-Session" textual indicator, a color and/or pattern of color representative of a multi-session transaction, an indication of additional information, and/or other such indication. Further, the purchase confirmation user interface may identify a total number of items in the transaction, a total cost, a total number of items per session, a total cost per session, other such information or a combination of two or more of such information. Some embodiments display one or more options that can be used to cause addition details to be displayed. The activation of one of these options (e.g., swipe-up action) can cause the display of addition session optical machine-representations 254*a*-254*b* (e.g., session barcode, session QR code, etc.) that each correspond to one of the purchase sessions of the multi-session transaction. In some instances the session optical machine-representations can be enlarged. Similarly, in some instances an option may be provided to access details about items in a respective one or all of the sessions. For example, the displayed multiple session codes 254*a*-254*b* can be selectable to cause a display of the items included within the respective session, an identification of a number of items in the session, a total cost of the session and/or other such information.

Figure 2C:
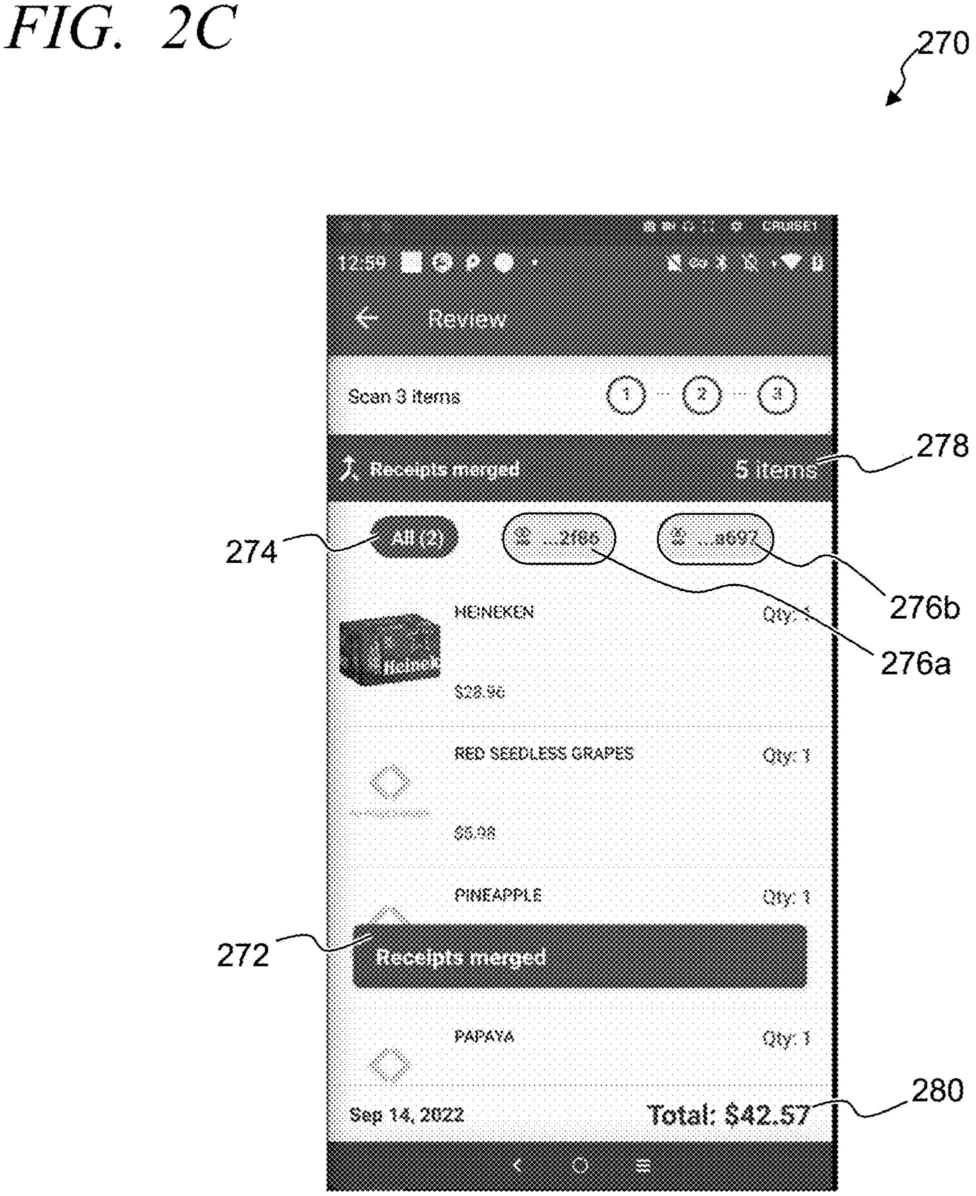
FIG. 2C illustrates a simplified graphical representation of an exemplary audit user interface, in accordance with some embodiments.

The exit audit APP 108 can similarly provide information about the transaction and/or sessions of a multi-session transaction. For example, an audit user interface may be displayed in response to scanning a transaction code. The audit user interface can identify the transaction as a single session transaction or a multi-session transaction. Similarly, options may be provided to get details about different sessions, such as an option to see identifiers and/or codes of each session, item lists of one or more of the sessions, indications of purchase restriction conditions and/or other such information. FIG. 2C illustrates a simplified graphical representation of an exemplary audit user interface 270, in accordance with some embodiments. A multi-session transaction notification 272 may indicate that the transaction includes multiple sessions. Additionally or alternatively, the audit user interface may include a session count indicator 274 identifying a number of sessions, and may in some instances be selectable to display information about all of the sessions (e.g., an item listing of all products from the multiple sessions linked in the transaction). Some embodiments include session options 276*a* and 276*b* each corresponding to one of the multiped session of the transaction. Again, such options may be selectable to access information about a corresponding session (e.g., item list, total number of items 278, total cost 280, method of payment, etc.).

In some embodiments, the cart compile APP 112 being executed by the customer computing device 110 uses the received transaction information to dynamically generate, locally by the customer computing device, the transaction optical machine-readable representation 252 that encodes dynamically generated unique session identifiers of each purchase session linked to the single transaction. In other implementations, a purchase control circuit generates the transaction optical machine-readable representation corresponding to the single transaction, and communicates the information of the transaction optical machine-readable representation of the single transaction to enable the customer computing device, typically through the cart compile APP, to display the optical machine-readable representation corresponding to the single transaction. This single transaction optical machine-readable representation corresponds to the single transaction and can be used in a purchase confirmation process, enable customer and/or others to access details about one or more of the multiple purchase sessions of the single transaction and/or other such uses.

As introduced above, in some instances a customer may be asked to confirm some or all of the purchases made through the cart compile APP 112 and/or other purchases. The associate computing devices 106 can, in some implementations, be used to help in performing an exit audit of customer purchases. The associate computing devices 106 can include one or more associate device control circuit that are configured to execute the exit audit APP 108 and to communicate via the distributed communication network 104 with the mobile purchase control system 102. Each of the associate computing devices 106, in executing the exit audit APP 108, can be configured to identify multiple scanned unique session identifiers of the single transaction. In some instances, the exit audit APP can extract and decoded the one or more unique session identifiers from the transaction optical machine-readable representation 252. For example, the optical machine-readable representation may be scanned by a barcode scanner and information provided to the exit audit APP, the exit audit APP may control an imaging system of the associate computing device to capture one or more images of the optical machine-readable representation and decode the unique session identifiers, communicate some or all of the image and/or information extracted from the image to a separate processing system and receive the unique session identifiers based on that processing, other such methods or a combination of two or more of such methods.

In some embodiments, customer computing device 110 can display the transaction optical machine-readable representation enabling the displayed transaction optical machine-readable representation to be scanned, or otherwise processed by the associate computing device 106, or other scanning or imaging system. For example, a scanning device may be positioned proximate to where an associate is intended to perform the audit, and customer can scan the transaction optical machine-readable representation. The scanning device can communicate the information to the associate computing device and/or a separate processing device that communicates the relevant session identifiers and/or information about products purchased in each session. In other embodiments, the customer device may additionally or alternatively display optical machine-readable representations of each purchase session encoding the session identifier. Each of the multiple scanned unique session identifiers corresponds to one of multiple purchase sessions linked to the single transaction and/or correspond to purchase sessions that have not yet been audited or otherwise confirmed. The associate device control circuit in executing the exit audit APP 108 can be configured to cause the associate computing device 106 to display, in response to identifying the purchase sessions of the single transaction, a listing of session identifiers of each of the multiple sessions linked to the single transition and/or display in association with a respective one of the session identifiers a listing of one or more item purchased through the respective purchase session.

The audit may include providing instructions to the associate through the associate computing device, to confirm one or more products attempting to be taken from the retail facility by the customer have been purchased. In some embodiments, the exit audit APP 108 receives item identifier information from a scanning device (e.g., barcode scanner, imaging device, RFID scanner device, etc.) and/or enables the utilization of a camera system of the associate computing device 106 to capture one or more images of a respective item and obtain or otherwise extract identifying information of the respective item (e.g., barcode of the item, QR code of the item, OCR of text, color pattern recognition, etc.), and identify one or more items attempting to be removed from the retail facility by the customer. Using the session identifier the exit audit APP 108 can obtain listings of products associated with each of the one or more purchase sessions of the single transaction, and can be configured to confirm that each of the item identifiers obtained by scanning or the like is included in at least one of the multiple sessions.

The audit confirmation may not require a confirmation of all items attempting to be removed by the customer, and instead may be limited. The limit may be a fixed number (e.g., scan any three items, scan any five items, scan any 10 items), may be based on a number of items associated with the multiple purchase sessions, may be based on the number of purchase sessions of a single transaction, may be based on a cost of one or more items, may be based on a total cost of one or more sessions, may be based on a total cost of the sessions of a single transaction, other such factor or a combination of two or more of such factors. The exit audit APP 108, in some instances, can provide instructions to the associate directing the associate regarding the number of items to scan and/or specific items to be scanned. Further, in some instances, the exit audit APP 108 can cause the associate computing device 106 to display an audit and/or purchase confirmation user interface in response to confirming the items identified were included in one of the purchase sessions. An audit confirmation may be communicated to the purchase control system 102, which in turn may provide a customer audit confirmation to the customer computing device 110 to control the customer computing device to display a customer audit and/or purchase confirmation user interface.

The sale of one or more items of a given purchase session may be finalized and payment obtained by the purchase control system 102 in response to the user authorizing check-out and/or other payment authorization (e.g., by selection of a payment method, and confirming an authorization for the retail entity to obtain payment via the selected payment method). In other instances, the final sale and receipt of payment may not occur at the time the customer completes a check-out, and instead payment may be finalized and received following the exit audit and/or in response to confirming that one or more purchase restriction conditions are satisfied and/or completed. As introduced above, some products, purchase sessions and/or transactions are associated with one or more purchase restriction conditions. Accordingly, the exit audit can be used, in some instances, to confirm the satisfaction of the one or more purchase restriction conditions.

The purchase control system 102 can be configured to identify that one of the purchase sessions of a single transaction includes at least one item having a purchase restriction condition. Depending on the type of purchase restriction condition, the purchase control system 102 can incorporate restriction information into the transaction information that can be provided to the customer computing device 110 and/or associate computing devices 106 corresponding to the multiple purchase sessions. In some embodiments, the detection of a purchase restricted item (e.g., age restriction) in a first one session of the multi-session transaction can cause the first session to be designated as a purchase restricted session. Additionally or alternatively, in some instances the multi-session single transaction with which the first session is linked can be designated as a purchase restricted transaction based on the one or more sessions including the item having a restriction condition. This designation of the single transaction as a purchase restricted transaction, in some instances, can be implemented regardless of whether any of the other purchases session of the single transaction include an item with a purchase restriction. Some embodiments can designate one or more other linked sessions or all of the sessions linked in the multi-session transaction to similarly be designated as purchase restricted sessions linking the restriction condition across two or more of the other checkout sessions based on the link to the first session including the purchase restricted item. Accordingly, the exit audit of such a purchase restriction designated single transaction, in some embodiments, cannot be finalized until the restriction condition is satisfied, the purchase session having the purchase restricted item is aborted and/or the purchase restricted item is removed from the respective session. Further, the purchase control system 102, in compiling the transaction information to be communicated the customer computing device and/or the associate computing devices 106 cause the customer computing device 110 and/or associate computing device to indicate in relation to the optical machine-readable representation corresponding to the single transaction and/or the identification of the single transaction that the single transaction is a purchase restricted transaction and/or one or more purchase sessions is a purchase restricted session. Such restriction designation can include substantially any relevant designation, such as but not limited to a different color scheme, textual notice, a header, flashing of one or more objects of a displayed interface, a different shape and/or kind of optical machine-readable representation, other such designations, or a combination of two or more of such designations. For example, the information from the purchase control system 102 can control the customer computing device 110 when displaying a purchase confirmation user interface 250 to display the optical machine-readable representation 252 in a different color (e.g., red or other color), incorporate a header and/or a textual restriction notification 260 (e.g., indicating a type of restriction condition, such as but not limited to an age restriction condition).

The purchase control system 102 can further be configured in communicating the transaction information to include a transaction restriction notification that provides some control over the customer computing device causing the customer computing device, when displaying the optical machine-readable representation 252, to include a displayed designation (e.g., change in color, color pattern, header, textual content, flashing, etc.) indicating that the single transaction is a purchase restricted transaction. Additionally or alternatively, the display of the transaction machine-readable representation 252 (and/or session machine-readable representations) and/or purchase confirmation user interface 250 can include or be accompanied with the display of one or more instructions to take one or more action to satisfy the purchase restriction condition. The instructions may be directed to the customer and/or the associate performing the audit. Similarly, the associate computing device 106 in implementing the exit audit APP 108 can further be configured, upon scanning the transaction machine-readable representation 252 and/or the session machine-readable representations, to display a restriction condition designation (e.g., change in color, color pattern, header, textual content, flashing, etc.) indicating that the single transaction is a purchase restricted transaction, and/or instructions to take one or more action to satisfy the purchase restriction condition. The instructions can include, but is not limited to, instructions to confirm a customer's age, instructions to confirm a customer's identification, directing the removal of anti-theft and/or protection features, other such instructions, or a combination of two or more of such instructions.

Similarly, in executing the exit audit APP 108, an associate device control circuit of an associate computing device can be configured to identify, in response to scanning the optical machine-readable representation 252, that the transaction and/or a first item of a first session of the multi-session transaction has a purchase restriction condition, and display a restriction condition user interface that, in some implementations, can include an entry option that is configured to receive a current condition corresponding to the purchase restriction condition. For example, the entry option may include a one or more fields to enter a customer's date of birth, an option to activate an imaging system to capture an image of a customer's government issued identification and image processing to determine whether corresponding age satisfies an age restriction, and/or other such entry options. The exit audit APP 108 can receive a current condition response based on interaction of an associate through the restriction condition user interface, and determine whether the restriction condition is satisfied. The evaluation of the received condition information may, for some restriction conditions, be processed by the exit audit app. In other instances, the received condition information may be communicated to the purchase control system 102 for processing and/or evaluation, with a response communicated back to the associate computing device. In some instances, when it is determined, based on the received current condition, that the purchase restriction condition is unsatisfied, the exit audit APP 108 can prevent authorization of a completion of a sale of at least the first item in at least the first session. In some instances, the exit audit APP 108 can prevent authorization of a completion of sales of all items in at least the first session in response to confirming, based on the current condition, the purchase restriction condition is unsatisfied.

Further, in some embodiments, the failure to satisfy one or more purchase restriction conditions can result in an error condition. Other error conditions can occur during the exit audit. Such errors may include a failure to receive payment. As introduced above, some sessions may not be finalized and payment received until one or more conditions are satisfied, such as confirming satisfaction of one or more purchase restrictions, or other conditions. Other embodiments may finalize and receive payment upon the exit audit being completed.

Accordingly, should the receipt of payment be unsuccessful at the time of the exit audit, an error condition typically results. Similarly, should a failure to satisfy a restriction condition occur, and error condition can result.

In response to a failure of one or more purchase restriction conditions and/or other errors, an error notification may be communicated from the purchase control system 102 and/or the associate computing device 106 to the customer computing device 110 to control the customer computing device to display the error notification. In some instances, the error notification identifies the corresponding purchase session that has experienced the error and/or failed to satisfy a purchase restriction. Some embodiments may further provide a user selectable abort option displayed in an error notification user interface displayed through the customer computing device 110 and/or the associate computing device 106. For example, should an age restriction condition of an item associated with a first purchase session of the multi-session transaction be unsatisfied at the exit audit, an error user interface may be displayed on the customer computing device 110 and/or the associate computing device 106 with an abort option. The customer, through the customer computing device 110, or the associate through the associate computing device can initiate a session abort of the first session, or in some instances a transaction abort option. The cart compile APP 112 or the exit audit APP 108 can communicate the abort notification to the purchase control system. The purchase control system 102 can abort the first session of the single transaction in response to receiving an abort notification communicated from the customer computing device or the associate computing device based on a selection by the customer or associate of the abort option. The aborting of one of the sessions of the multi-session transaction, however, does not necessarily require aborting the entire transaction. Accordingly, the purchase control system 102 can abort the first transaction, which can include preventing receiving payment and/or refunding payment for those items in the first session, while maintaining one or more other purchase session as active and as part of the single transaction.

Other errors and/or conditions may result during the exit audit. The purchase control system and exit audit APP 108 can be configured to respond to different error conditions. For example, an error condition may result when an item is scanned during the exit audit and determined that the scanned item is not included in any of the purchase sessions of the single transaction (e.g., the customer incorrectly scanned the item and thus the item was not added to a virtual cart, the customer inadvertently did not scan the item to incorporate the item into a virtual cart, etc.). In such instances, the exit audit APP 108 can notify the associate of the error and direct the associate to inquire whether the customer wants to leave without the item or purchase the item. In those instances where the customer wants to purchase the item the customer may initiate another purchase session (e.g., through the purchase more items option in the purchase confirmation user interface), assuming a session limit for the particular single transaction has not been reached. Similarly, some embodiments enable the automatic initiation of an additional purchase session, assuming a session limit has not been reached, as part of the single transaction.

In some embodiments, the purchase control system 102 can be configured to automatically establish, in response to a determination at an associate computing device 106 that an identification of a first item attempting to be removed from the retail facility by the customer in association with other items of the single transaction is not an item included in one of the multiple sessions of the single transaction, an additional purchase session corresponding to an additional virtual cart automatically implemented. Further, the purchase control system can automatically incorporate, without further interaction, at least a first item identifier of the first item into the additional virtual cart. This additional purchase session can additionally be linked with the single transaction and/or other one or more sessions of a single transaction. In those instances where there is only a single purchase session at exit audit, a single transaction may be established in response to the establishing of the additional purchase session and linking between the initial purchase session and the additional purchase session. Purchase session information corresponding to the additionally created purchase session and/or virtual cart information of the additional virtual cart can be communicated to the customer computing device and the cart compile APP 112 can be configured to cause the customer computing device to display the additionally created virtual cart on the customer computing device. This can allow the customer to view the cart, confirm the item or items in the cart and complete the sale, which may include allowing the customer to select a method of payment and/or preform other options. By allowing the multiple sessions, a customer can select different methods of payment for different purchase sessions. In some embodiments, a customer can view a first virtual cart, select one or more items from that first cart to be virtually moved into a second virtual cart. The creation of the second virtual cart can induce a second purchase session to be initiated and linked with the first purchase session. The sale of these separate sessions can then allow the customer to use the same or different methods of payment for the separate sessions. Similarly, the check out of different sessions can, in some embodiments, include an option to allow the customer to select a method of payment and/or enter a new method of payment. As such, different methods of payment can be used for different purchase sessions.

Additionally or alternatively, the purchase control system 102 can provide virtual cart information to an associate computing device, such as the associate computing device being used to perform the exit audit or another associate computing device to which the customer is directed as a result of an error condition. The associate computing device may be configured to display a virtual cart user interface with a check-out option that the associate can allow the customer to activate or an associate can select in response to verbal authorization from the customer to complete the sale. Again, the newly created purchase session is linked as part of the single transaction and the exit audit can be re-activated and/or continued to finalize the sale and complete the exit audit.

The detection of one or more errors at the exit audit can additionally or alternatively result in a failure to complete the sale of one or more items of one or more sessions or the entire single transaction. The purchase control circuit 102, in some embodiments, can instead direct the customer to a point of sale (POS) system to complete the sale of one or more items through traditional purchasing methods instead of through the cart compile APP 112. In some instances, the purchase control system 102 can receive, from an associate computing device 106, one or more scanned unique session identifiers and/or a transaction identifier extracted and decoded by the associate computing device from the transaction optical machine-readable representation 252 or one or more session machine-readable representations 254*a-b* in response to optically scanning the optical machine-readable representation displayed by the customer computing device corresponding to the single transaction, or one or more sessions. Each of the multiple session identifiers corresponding to one of the multiple purchase sessions linked relative to the single transaction. The purchase control system can be notified of and/or determine an error condition associated with one or more sessions of the transaction. Based on the error and/or a failure to cure the error condition, the purchase control system can communicate a point of sale (POS) notification to the customer computing device 110 to control the customer computing device to display an error user interface directing the customer to return to a POS system 116 to complete a sale of the one or more items associated with the first session. The purchase control system 102 can abort the one or more sessions associated with the error condition, or the entire transaction should the error correspond to each session of the transaction. The purchase control system 102, in some implementations, can additionally or alternatively communicate an associate POS notification to the associate computing device 106 to control the associate computing device to display an error instruction user interface notifying that the customer is to return to a POS system 116 to complete a sale of the one or more items associated with the error session or sessions.

An associate computing device, executing the exit audit APP 108 through one or more associate device control circuits, can be configured to identify, from a listing of recent POS purchase sessions, a POS purchase session corresponding to the customer. Based on the correlation with the customer, the customer computing device can cause a merging to link the POS purchase session with the single transaction. This linking of POS purchase sessions with the single transaction enables customers to take advantage of POS systems 116 in addition to purchases through the customer computing devices. Similarly, a customer may be directed to a POS system 116 when an error condition cannot be satisfied, a purchase restriction condition cannot be satisfied, or other such situations. As such, the purchase control system 102 and/or the associate computing device 106 can establish a link between the one or more POS purchase sessions and one or more purchase sessions executed through the customer computing device 110. Such POS purchase session linking with one or more customer computing device purchase sessions may be based on one or more factors such as but not limited to the POS purchase session being associated with the particular customer (e.g., through a customer number, customer payment method, and/or other customer identifying information), a time correlation (e.g., the POS purchase session occurred within a threshold time of one or more of the customer device purchase sessions), location correlation (e.g., the POS purchase session occurred at a same retail facility as one or more of the customer device purchase sessions, at locations that are within a threshold distance, etc.), item correlation, other such factors, or a combination of two or more of such factors.

In some implementations, for example, an error condition may be associated with a first purchase session of a transaction, and the customer may be directed to complete the sale through a POS system 116. At the POS system, the customer may present a session optical machine-readable representation displayed on the customer computing device 110 that can be scanned at the POS system enabling the POS system to pull up item information for each of one or more items of the purchase session, and complete a sale of one or more items of the purchase session and establish a POS purchase session that corresponds to the customer device purchase session, and a correlation between the POS purchase session that corresponds to the customer device purchase session. Additionally or alternatively, the associate computing device 106, through the execution of the exit audit APP 108, may identify a purchase session based on scanning of the optical machine-readable representation of the transaction that was aborted or otherwise had an unresolved error condition. Based on that purchase session associated with that customer, the exit audit APP can identify a POS purchase session corresponding to that aborted purchase session or purchase session in an error state, and establish a link between the POS purchase session and the one or more other purchase sessions of the single transaction. The exit audit APP 108 can preform the final authentication, at the single time, of the single transaction comprising one or more customer device purchase sessions and one or more POS purchase sessions.

In some embodiments, the purchase control system 102 can be configured to receive a POS purchase notification from a POS system 116 at a retail facility. The POS purchase notification can include a customer identification exclusively associated with a particular customer and an additional item identification information for each of one or more additional items purchased through the POS system 116 in a POS purchase session. The purchase control system 102 can link, in response to the POS purchase notification and based on the customer identification, the POS purchase session to the single transaction such that the POS purchase session is one of the multiple purchase sessions linked with the single transaction. The linking can, in some instances be based on identifying the single transaction associated with the customer and identify a threshold relationship between the single transaction and the POS purchase session. The exit audit APP 108 can use the single transaction information to confirm scanned items have been purchased in one of the multiple purchase sessions, including the POS purchase session.

Figure 3:
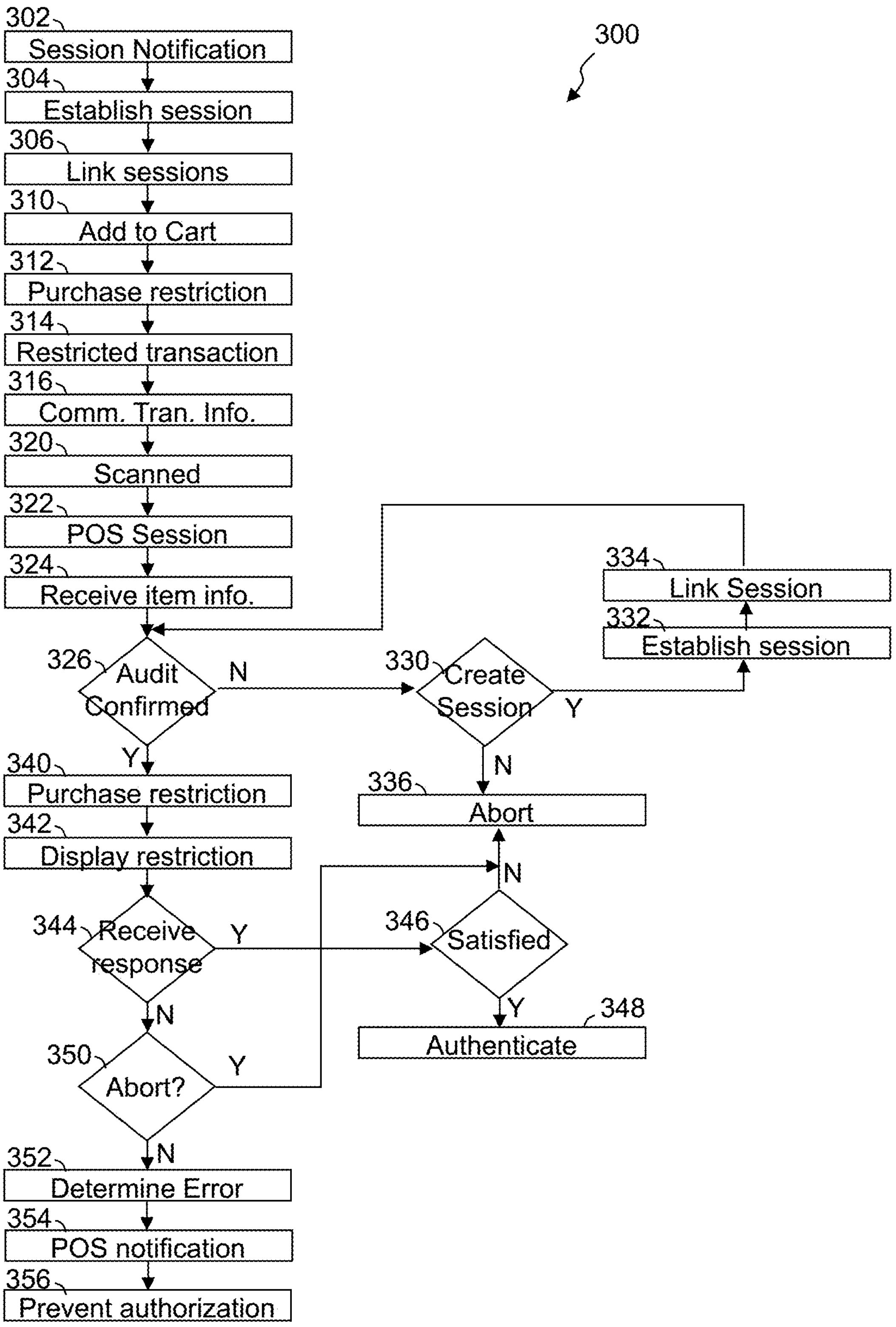
FIG. 3 illustrates a simplified flow diagram of an exemplary process of controlling mobile devices in purchasing items, in accordance with some embodiments.

FIG. 3 illustrates a simplified flow diagram of an exemplary process 300 of controlling mobile devices in purchasing items, in accordance with some embodiments. In step 302, a session notification is received at the purchase control system 102, via the distributed communication network 104, from a mobile customer computing device 110 to initiate an additional purchase session. In some embodiments, the notification to initiate an additional purchase session can be in response to an activation by the customer of an additional purchase option provided on a confirmation user interface displayed, in association with a first purchase session, on the customer computing device 110. The mobile customer computing device 110 can be associated with a customer and can be executing a cart compile application 112. In step 304, an additional purchase session is established in response to the session notification. In step 306 the first purchase session and the additional purchase session can be linked as a single transaction.

In step 310, item identification information can be incorporated into a second virtual cart for each of one or more items identified, through the customer computing device, by the customer and intended to be purchased by the customer in association with the additional purchase session. The second virtual cart can be associated with the additional purchase session, and is different than a first virtual cart associated with the first purchase session. In step 312, it can be identified that the first session includes a first item having a purchase restriction condition. In step 314, the single transaction can be designated as a purchase restricted transaction based on the first session including the first item that is associated with a purchase restriction condition. In step 316, transaction information can be communicated to the customer computing device 110, via the communication network 104. The transaction information can comprise information from both of the first purchase session and the additional purchase session and can control the customer computing device 110 in displaying an optical machine-readable representation corresponding to the single transaction and encoding dynamically generated unique session identifiers of each purchase session linked to the single transaction comprising a first unique session identifier corresponding to the first purchase session and a second unique session identifier corresponding to the additional purchase session. In some embodiments, the communication of the transaction information can comprises communicating a transaction restriction notification causing the customer computing device, when displaying the optical machine-readable representation, to include a displayed designation indicating that the single transaction is a purchase restricted transaction and further display instructions to take a first action to satisfy the purchase restriction condition.

In step 320, multiple scanned unique session identifiers can be identified, via an exit audit APP 108 executed on an associate device control circuit of an associate computing device 106. The session identifiers can be extracted and decoded from the optical machine-readable representation in response to optically scanning, via the associate computing device, the optical machine-readable representation displayed by the customer computing device corresponding to the single transaction. Each of the multiple scanned unique session identifiers can correspond to one of multiple purchase sessions linked to the single transaction. In step 322, a POS purchase session can be identified, from a listing of recent point of sale (POS) purchase sessions, that corresponds to the first purchase session, and the POS purchase session can be merged to link with the single transaction. In some embodiments, the identification of the POS purchase session can be in response to identifying, via the exit audit APP 108 and in response to scanning the optical machine-readable representation of the single transaction displayed on the customer computing device, the first purchase session is in an error state.

In step 324 item identifying information can be received for each of multiple physical items associated with the customer. The item identifying information can, in some embodiments, be captured by the associate computing device 106. In step 326, it can be confirmed, by the exit audit APP 108, that each of the item identifiers is included in at least one of the multiple sessions of the single transaction.

When an item is not identified as associated with one of the multiple purchase sessions, some embodiments advance to step 330 where it can be determined whether to create an additional purchase session. When an additional purchase session is to be established, the process 300 can advance to step 332, where a third purchase session automatically establishing corresponding to a third virtual cart automatically implemented and at least a first item identifier of the first item can be incorporated into the third virtual cart. In step 334 the third purchase session is additionally linked to other purchase sessions of the single transaction. Some embodiments alternatively advance to step 336 where an abort notification can be received from the customer computing device 110. The abort notification can correspond to one of the purchase sessions linked to the single transaction, such as a purchase session associated with an error and/or unsatisfied purchase restriction. The identified session can be abort while maintaining as active one or more other purchase sessions linked to the single transaction.

In step 340, it can be identified, via an exit audit APP executed on an associate device control circuit of an associate computing device and in response to scanning the optical machine-readable representation, the first session comprises at a first item having a purchase restriction condition. In step 342, a restriction condition user interface can be caused to be displayed on the associate computing device 106 and/or the customer computing device 110. In some embodiments, the restriction condition user interface can be configured to receive a current condition corresponding to the purchase restriction condition. In step 344, a current condition response can be received based on interaction of an associate through the restriction condition user interface.

In step 346, it can be determined whether the restriction condition is satisfied. When the restriction condition is satisfied, some embodiments advance to step 348 causing a final authentication of the single transaction in authenticating at a single time both the first session and the second session. When the restriction is not satisfied, some embodiments determine in step 350 whether one or more of the purchase sessions and/or the single transaction should be aborted. When a session should be aborted, the process can return to step 336. In step 352, an error condition associated with the first session of the transaction can be determined. In step 354, a point of sale (POS) notification can be communicated to the customer computing device 110 to control the customer computing device to display an error user interface directing the customer to return to a POS system 116 to complete a sale of the one or more items associated with the first session. Some embodiments additionally or alternatively advance to step 356 where authorization of a completion of sales of at least the first item in at least the first session can be prevented in response to confirming, based on the current condition, the purchase restriction condition is unsatisfied.

Figure 4:
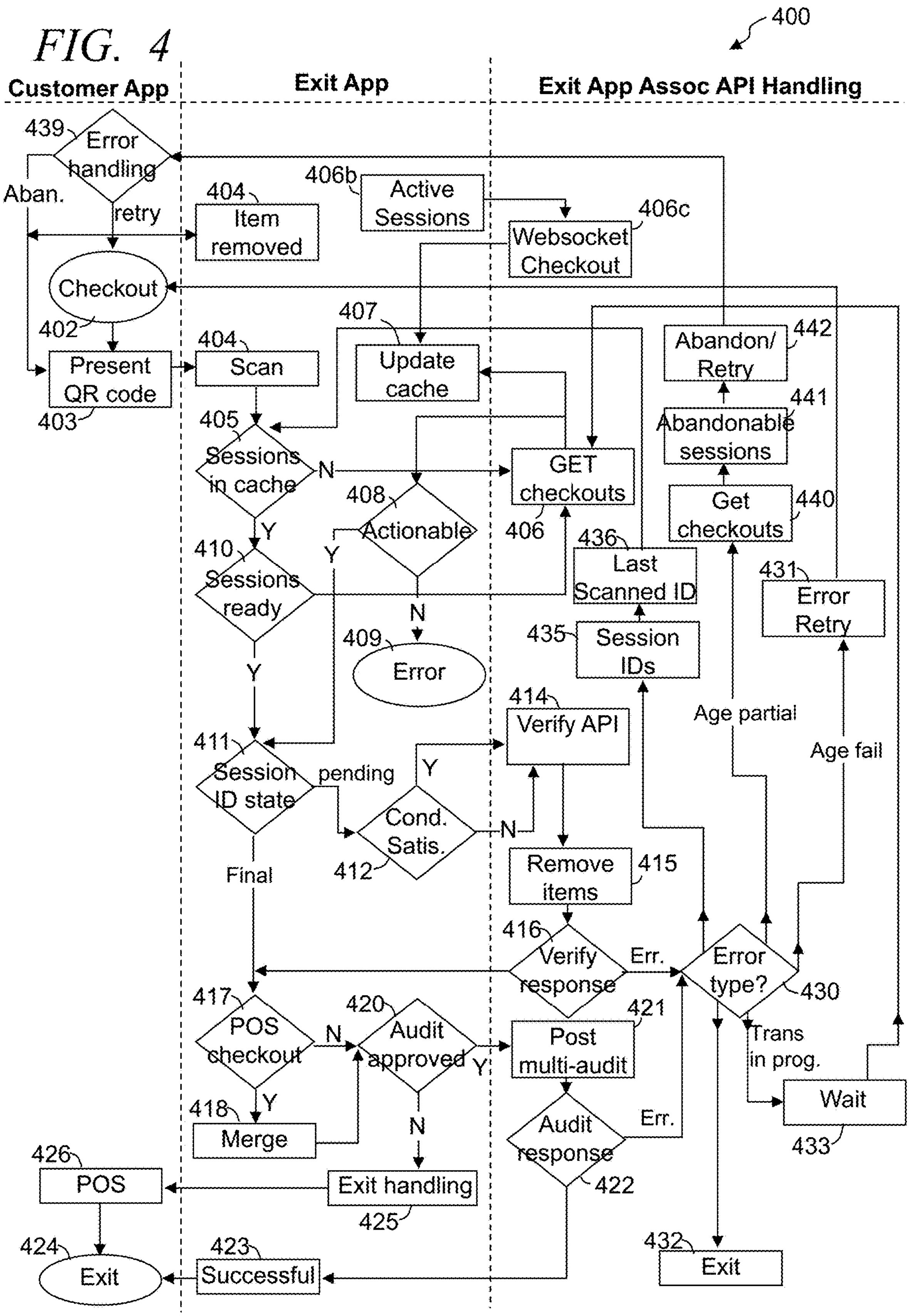
FIG. 4 illustrates a simplified flow diagram of an exemplary process of providing control over mobile devices in enabling the purchasing of items by a customer through a customer computing device, in accordance with some embodiments.

FIG. 4 illustrates a simplified flow diagram of an exemplary process 400 of providing control over mobile devices in enabling the purchasing of items by a customer through a customer computing device 110, in accordance with some embodiments. At step 402, a customer initiates and/or completes a checkout process of one or more products of a session. The checkout is typically implemented the cart compile APP 112, and in some instances authorized payment. The authorization of payment may include the selection of one of multiple different methods of payment and/or an option to enter a new form of payment (e.g., credit cart, gift card, debit card, government issued form of payment, and other such payment methods). Based on the session checkout an optical machine-readable representation is generated that corresponds to the transaction, which may be a single session when a second session has not already been initiated, or may be a multi-session transaction optical machine-readable representation (e.g., QR code). When corresponding to a multi-session transaction, the machine-readable representation can be generated as a composite of some of the information from the multiple checked out sessions linked as a single transaction, can include link identifiers that are part of the respective sessions, other such information, or a combination of two or more of such information. In some embodiments, the addition of a new session linked as part of the single transaction results in the creation of a new machine-readable representation consistent with the multi-session transaction.

In step 403, the machine-readable representation can be presented to an exit audit associate. The machine-readable representation can be displayed by the customer computing device 110, presented on a printed receipt, or otherwise presented. In step 404, the audit associate can use an associate computing device 106 to scan the displayed machine-readable representation of the transaction and in some instances obtain checkout session identifiers (ID). In step 405, the exit audit APP 108 can in some embodiments determine whether transaction information has already been received (e.g., cached) at the associate computing device (e.g., if all session IDs are locally saved). This can include, in some instances, checks to determine (e.g., via one or more Websockets) whether one or more QR codes have previously been scanned and determine whether there are any earlier session and/or transaction QR code information in cache. When information is not fully local, the process in some instances can advance to step 406 where transaction information can be acquired. This acquisition may utilize some or all of the information obtained from the scan and decoding of information from the machine-readable representation. The acquisition, in some implementations can be a check over one or more websockets (e.g., GET v3 checkouts by customer) and/or through one or more application program interface (API). The checkout information can include POS session information, mobile purchase session information and/or other relevant purchase session information. In some embodiments, in step 407, the transaction information is received at the associate computing device (e.g., cached in local memory). The process 400 can return to step 405 to confirm transaction information is available. Some embodiments include step 406*b* where a connection is established with one or more databases storing session and/or checkout information, and step 406*c* where session information is periodically and/or in response to one or more triggers forwarded to update information on the associate computing device 106 and/or a database readily accessible to the associate computing device (e.g., a websocket checkout event retrieval).

In step 408, the exit audit APP 108 evaluates the information of the transaction and the overall states of the transactions to confirm the extracted session IDs correspond to actual, and the transaction should proceed to the audit (e.g., transaction and/or session QR IDs exit). When one or more session IDs are invalid or other error conditions are detected, the process identifies an audit failure error and exits the audit process in step 409 (e.g., checkout process is in an incorrect state, not actionable, APP error, possible fraudulent activity, etc.). This can include notifying the associate and/or the customer through respective computing devices. When the session IDs are actionable, the process 400 can advance to step 410 to confirm that each session associated with a transaction is ready for the audit process (e.g., sessions are “checkout-finalized” or ready to confirm a purchase restriction condition).

In step 411, determine a state of one or more of the purchase sessions and/or whether there are one or more sessions that have one or more purchase restriction conditions (e.g., age verification, customer identification, etc.). When a restriction condition is applicable (e.g., age verification), the process can advance to step 412 where the process can confirm whether the data is to be received in relation to the restriction condition and/or whether the restriction is dependent on other actions. The process, in step 414, can in some embodiments implement one or more APIs to acquire relevant input information and confirming restriction condition information. In step 415, information can be communicated to the associate computing device and/or the customer computing device to display information about the restriction condition and/or whether one or more products is to be removed based on a failure to satisfy one or more restriction conditions. In step 416, it can be determined whether restriction conditions have been satisfied.

When it is determined in step 411 that the states of the purchase session do not correspond to restriction conditions and/or following the confirmation in step 416 that restriction conditions are satisfied, the process can advance to step 417 where it can be determined by the exit audit APP 108 and/or the purchase control system 102 whether there is one or more POS sessions and/or other purchase sessions (e.g., purchased directly from an associate (e.g., concierge purchase session), and/or other such purchase sessions) that are linked or are to be linked to the single transaction (e.g., based on customer identifying information associated with the POS, a transaction identifier and/or session identifier associated with the POS session and corresponding to the single transaction, timing of the POS session relative to one or more customer device POS sessions, location information, other such factors, or a combination of two or more of such factors). When there are POS sessions, the process advances to step 418 where the one or more POS sessions and/or other purchase sessions are identified, merged and/or linked with one or more of the purchase sessions of the single transaction.

In step 420, the audit of the composite of the multiple purchase sessions of the transaction is performed and it is determined whether the exit audit is approved. When the audit some embodiments advance to step 421 where a post audit API is called. This post audit in some embodiments can include a verification of items. Such confirmation can include, for example, the customer associate scanning a predefined number of randomly selected items and the exit audit APP can confirm those identified items are included in one of the purchase sessions, and/or evaluate for other potential errors (e.g., fraud conditions, payment failure, etc.). In some embodiments, the number of items is independent of the number of sessions of the single transaction, which can avoid introducing additional delays. In other implementations and/or based on other conditions, the number of items to be scanned may vary. The number of items may be conditional on the number of sessions, the number of items, the frequency of purchasing by the customer, pricing of one or more items, pricing of the items of the transaction, other such factors, or a combination of such factors.

In step 422, it can be determined whether the API response confirms the audit is completed (e.g., scanned items are within one of the sessions). When completed, the process 400 can advance to step 423 where notification is designated at the associate computing device 106 and/or customer computing device 110, and the customer can exit the retail facility at step 424. When it is determined in step 420 that the audit is not approved (e.g., detection of potential fraud, failure to obtain payment, etc.), the process in some embodiments advance to step 425 to perform exit handling and notify the customer of the potential error. The one or more sessions can be aborted, and/or some embodiments provide step 426 that allows the customer to go to a POS system and complete purchases.

Some embodiments include step 430 following a detection of one or more error conditions in steps 416 and/or 422, where an error type is identified. Some embodiments include step 431 following a detection of one or more error conditions in steps 416 and/or 422 where the customer is given an option to retry to incorporate products into one or more sessions and/or to take items to a POS system. The customer can be given the opportunity to abandon one or more sessions and/or retry one or more sessions in step 439. With some errors, the process cannot continue, and the process advances to step 432 and terminated. Other errors may indicate further processing of one or more sessions is being performed (e.g., obtaining payment, etc.), and the process enters step 433 to wait a period of time and re-initiate the audit process.

Some errors can identify when one session is successfully audited, while an error occurred in one or more other sessions. In some of these instances, the process can advance to step 435, where the session identifiers are obtained for those that successfully passed audits, and in step 436 the one or more sessions that were not successfully audited because of one or more errors are identified. The customer computing device and/or the associate computing device are notified of unaudited sessions, and the customer is given an opportunity to allow the system to generate a new composite transaction of the remaining sessions, where a new machine-readable representation of the new composite transaction can be used to restart the audit process of the remaining sessions. In some embodiments, when an error is detected the process advances to step 440 to determine one or more sessions that have not completed audit. In step 441, it can be determined whether one or more remaining sessions are abandonable. In step 442, the customer is presented with an option to abandon and/or retry one or more of the sessions. Other embodiments enable the partial auditing of one or more sessions. For example, when an age restriction error is detected, each session of a transaction can be evaluated for the age restriction condition. It can be determined for each that have the age restriction condition whether age restricted items can be removed from the session. When they can be removed, the associate is instructed to remove the item(s) and attempt to reauthorize payment for remaining items of the session. A composite listing of items to be removed can be communicated to the associate computing device and/or the customer computing device. In other instances, it is determined whether a session can be abandoned. When it is abandonable, the session may be abandoned. This process can be repeated for each session of the transaction. When one or more sessions remain that do not include the age restriction condition, the process can return to step 403 or other relevant step (e.g., step 410, 411) to attempt the audit again with the remaining sessions without the age restriction condition because of the removal of age restricted items.

In some instances, a transaction with a single session cannot be retried through the mobile purchasing when certain error conditions occur, such as a detection of a potential fraud error. As such, the customer can elect to return to a POS system or leave the items and cancel any potential purchase. Other embodiments, when one or more other sessions are linked, the process may allow one session to be abandoned while allow customer to complete the audit on one or more other sessions.

Figure 5A:
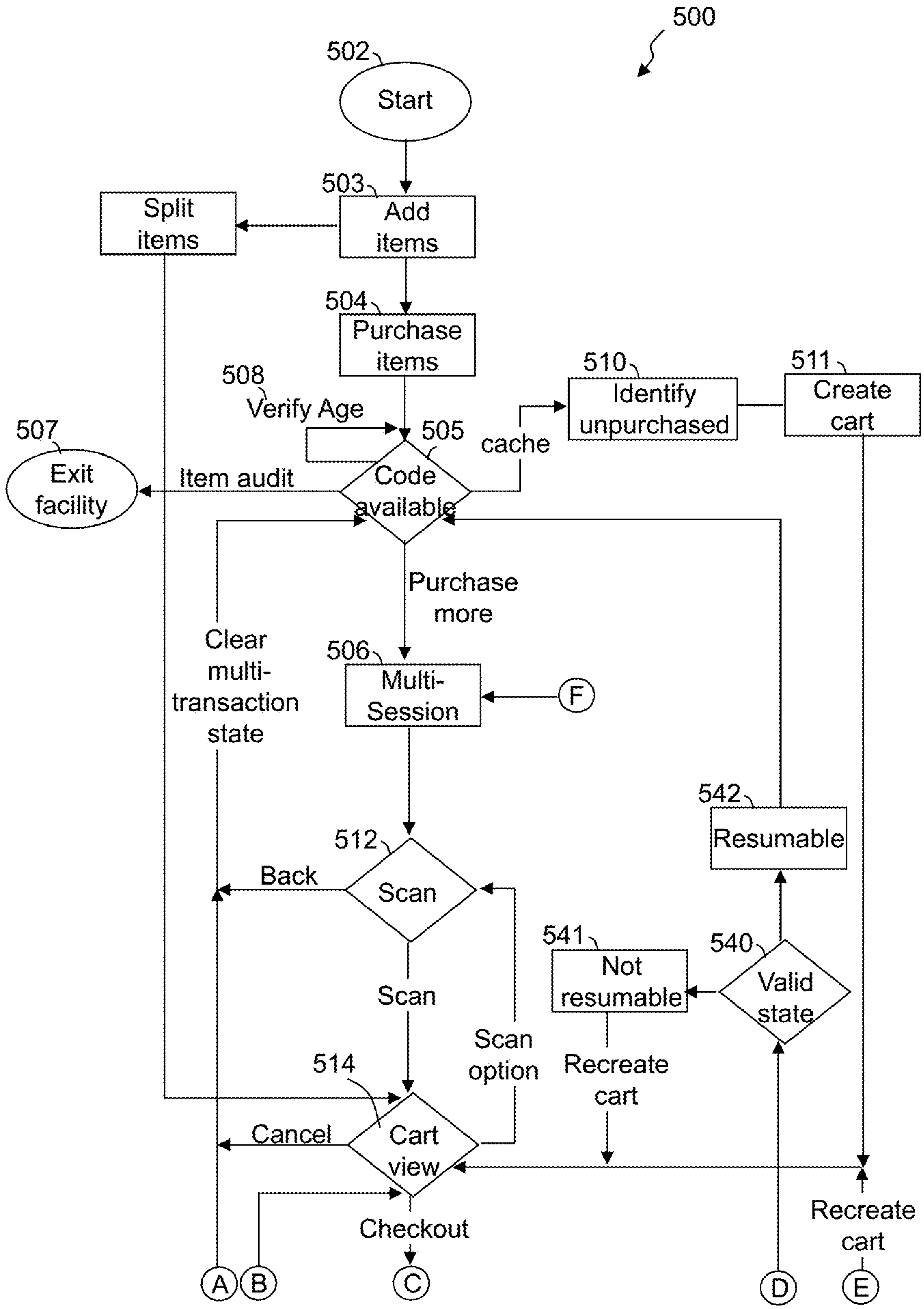
FIGS. 5A-5B illustrate a simplified flow diagram of an exemplary process of providing control over mobile devices in enabling the purchasing of items by a customer through a customer computing device, in accordance with some embodiments.
Figure 5B:
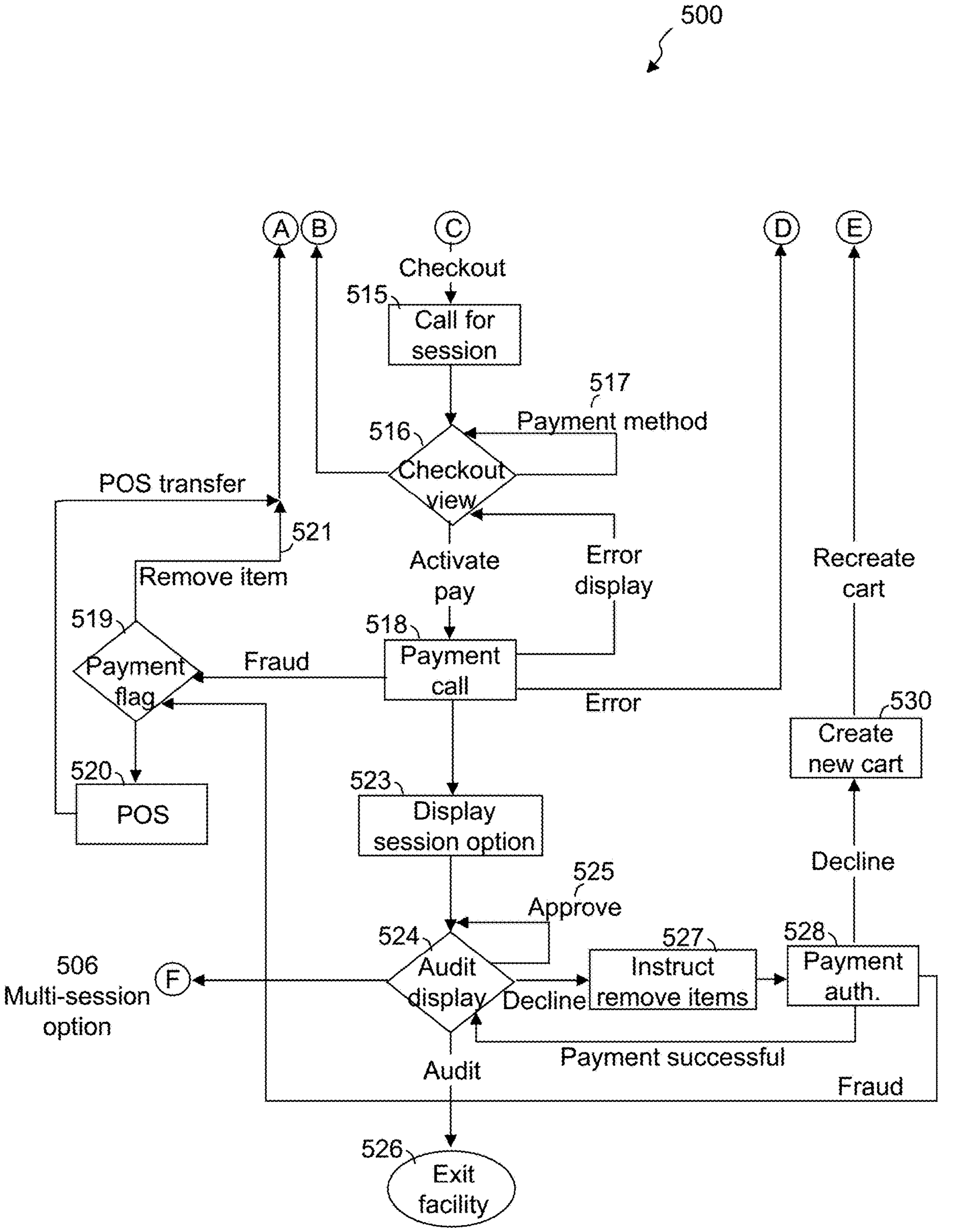

FIGS. 5A-5B illustrate a simplified flow diagram of an exemplary process 500 of providing control over mobile devices in enabling the purchasing of items by a customer through a customer computing device 110, in accordance with some embodiments. In step 502, a customer initiates a process to incorporate products into a virtual cart. In some implementations, this includes activating and executing the cart compile APP 112 on the customer computing device 110, which is at least temporarily associated with the customer. In step 503, items are added to the virtual cart. In some embodiments, the customer computing device 110 is used to scan (e.g., using a camera) one or more product identifiers and/or identifying aspects that enable accurate identification of an item, and the cart compile APP 112 incorporates the corresponding item identifier(s) into the virtual cart. In step 504, the customer initiates a purchase of the one or more items incorporated into the virtual cart. This can include selecting and/or authorizing a method of payment. Further, the customer computing device can display a confirmation of purchase and may further display an option 202 to purchase additional items. Still further, in some instances, the confirmation user interface displayed may further include a displayed machine-readable representation of the session. In step 505, one of multiple actions can be detected. In some embodiments, it can be detected that the customer has selected the purchase additional items option 202, advancing the process to step 506 described below.

In other instances, in step 505, it can be determined whether an audit has been confirmed. In some instances, for example, the audit can be conducted by the display of the machine-readable representation of the session on the customer computing device 110, the scanning by the associate computing device 106, and the confirmation of one or more items in accordance with identified one or more sessions. When the audit is confirmed, the customer can leave the retail facility at step 507. As described above, in some instances the audit can include the confirmation and/or attempted satisfaction 508 of one or more purchase restriction conditions (e.g., age confirmation). Additionally or alternatively, the audit can identify one or more items that were not included in a purchase session. In step 510, item identification for the one or more items not included in a purchase session can be obtained (e.g., scanning by an associate computing device 106 and/or customer computing device 110). Some embodiments include step 511 where an additional purchase session can automatically be created, and the one or more items not in a purchase session can be added to the additional purchase session. Some embodiments additionally or alternatively automatically generate an additional virtual cart and incorporate the identified items into the additional virtual cart.

In step 506, an additional purchase session is initiated and linked as a single transaction with the one or more previous pending sessions corresponding to the customer. In some implementations, the cart compile APP 112 can save a multi-session transaction state. In step 512 it can be determined whether one or more additional items are identified (e.g., scanned, selected from a listing, etc.) or of another action is performed, such as user selecting a "Back" option or a "cancel session" option. The cancelling of the session can, in some embodiments, cause the process to return to step 505 to proceed with an exit audit. Alternatively, the process can continue to receive one or more item identifying information for one or more items to be added to the additional session, and continue to update the transaction state information. The cart compile APP 112 in some implementations can display a cart user interface listing the one or more items in the current virtual cart and/or other relevant information (e.g., pricing, quantities selected, etc.). In step 514, it can be determined whether the customer intends to add additional items, causing the process to return to continue to incorporate one or more additional items (e.g., scan of another item), cancels the current session, which can cause the process to return to step 505, whether the customer initiates a check-out process, and/or other such action.

In response to a check-out option selection, the process 500 can advance to step 515 (FIG. 5B) to cause the purchase control system 102 to create a new checkout. In some implementations, the cart compile APP 112 can generate a call to the purchase control system 102, which can include one or more prior session identifications and/or prior checkout identifications as confirmation for the purchase control system in maintaining the single transaction and/or link between multiple purchase sessions. A previous checkout and/or session ID can be passed in the request for a new session creation to indicate the customer's true intention for a new session. Additionally or alternatively, previous session ID can prevent a duplicate session and/or virtual cart from being created in instances where the cart compile APP 112 automatically calls the API to recover from a previous checkout. In those instances, the previous session ID may not be passed, and the purchase control system can return the previous session ID rather than creating a new session.

The checkout process for the session can be initiated, and in some embodiments, the process 500 includes decision step 516, where payment method information can be selected and/or added (e.g., step 517), identify a selection of an option to return to view the cart and/or add additional items (e.g., step 514), whether to active payment, and/or other such actions. For example, when the customer activates a payment option (e.g., virtually slides a displayed payment option), the process can advance to step 518 that can trigger the purchase control system 102 to initiate calls to determine whether payment can be completed, whether payment has been declined, whether there is a potential fraud condition, whether there is other errors and/or logic errors (e.g., causing the process to advance to decision step 540), and/or other such actions. For example, when there is a payment decline, the process may return to step 516 to cause the cart compile APP to display an error and/or information about the decline. This may also provide the customer to initiate an alternative method of payment. Similarly, when fraud activity is detected, some embodiments advance to step 519 where a payment decision is implemented.

In some embodiments, a payment flagged can be a customer choice (e.g., presented through a user interface on the customer computing device) after the purchase control system indicate a potential fraud activity. This can provide the customer with options, such as cancel the checkout (remove items from cart), implement a POS session to complete purchase it at a POS system, and/or other such options. In some instances, in response to a potential fraud indication, subsequent sessions may be prevented until resolved (e.g., purchase through a POS system), which can notify the purchase control system to enable additional sessions when a session limit has not been reached.

This can enable the customer to remove 520 one or more items from a cart, request a transfer in step 521 to a POS system (e.g., causing the process to advance to step 505, which may result in a multi-session state being adjusted and/or cleared), and/or other such actions. The POS transfer can be completed and the transaction reverted to a previous transaction state and/or previous linked session, which can then allow the customer to take other actions and/or advance to the exit audit.

When a payment method is successful the multi-session transaction state can be updated and the process can advance to step 523 where the cart compile APP and/or the purchase control system can determine whether a purchase session limit has been reached, and the cart compile APP can cause the display of a purchase confirmation user interface. When a session limit has been reached, the purchase confirmation user interface does not include an option to initiate further purchases and/or another session. In some embodiments, the purchase confirmation user interface further displays one or more machine-readable representations (e.g., machine-readable representation of the transaction), which can encode a transaction identifier, one or more purchase session identifiers, other relevant information (e.g., latest session ID, total item count, total amount, timing, user identifier information, retail facility information, other such information, etc.), or a combination of two or more of such information. In step 524, an exit audit can be performed. Again, in some implementations, the associate computing device can scan the displayed machine-readable representation(s) and preform an audit process, such as one of the audit processes described above and further below. The audit can include the confirmation and/or attempted satisfaction of one or more purchase restriction conditions (e.g., step 525). When the audit is completed and successful, the process 500 can authorize the transaction in step 526, typically with the customer exiting the facility.

In some embodiments, when the audit fails the process 500 can initiate another purchase session when a session limit has not been reached, such as returning to step 506. Similarly, the failure of the audit, such as because of a failure to satisfy a purchase restriction condition (e.g., age) can cause the process to advance to step 527 where the cart compile APP 112 and/or the exit audit APP 108 can display instructions to remove one or more items corresponding to the failed purchase restrictions (e.g., remove one or more alcoholic beverage items) from the customer. Some embodiments include step 528 where after removal of the failed purchase restricted items, the payment may be reauthorized (e.g., removal of items would reduce the total cost, and reauthorization for the reduced cost). When payment is successful, the process can return to the audit step 524. In some embodiments, when fraud activity is detected the process 500 may advance to step 519. In other instances, when payment is declined, some embodiments, can optionally initiate an additional purchase session and/or additional virtual cart in step 530, which may include the automatic population of the additional virtual cart. Following the initiation of the additional virtual cart, the process 500 in some implementations can return to step 511.

As described above, in some error events in step 518 can cause the process to shift to decision step 540 where the error can be evaluated (e.g., invalid checkout state, unrecognized session identifier, unrecognized transaction identifier, etc.) and/or a state of one or more sessions can be evaluated. Based on the error, some embodiments identify in step 541 when a state of a purchase session is not resumable, and return to step 514 enabling the customer to populate the virtual cart with one or more items that were not finalized due to the earlier error condition. Additionally or alternatively, one or more sessions can be identified in step 542 as resumable (e.g., information is still available and valid), and the process may return to an audit step (e.g., step 505 and/or 524).

The multiple sessions enable customers that have already checked out of a session, and remember an item they forgot to purchase, to initiate an additional session to purchase one or more items, assuming a session limit has not been reached. Additionally or alternatively, some embodiments enable customers to utilize multi-session transactions to purchase items using two or more different methods of payment (e.g., a customer wants to use both EBT Food and cash to pay for items, but only 1 EBT payment method is allowed per transaction; a business customer wants to split their personal and business items; etc.). The establishment of different sessions can, in some implementations, allow the customer to specify a different payment methods for different sessions. Multiple sessions can allow the use of the mobile cart compile APP to seamlessly tie multiple sessions together into a unified transaction checkout experience that enables exit associates to review the combined sessions at the same time instead of independently, resulting in no additional friction to the audit experience.

The backend purchase control system 102, in some embodiments, implements one or more APIs that that link multiple purchase sessions for a given customer together. The sessions can be dependent on one or more factors, such as customer, retail facility, location, time, date, other such information or a combination of such information. A data structures can be created to send data to the cart compile APP 112 and/or exit audit APP 108 for processing. In some implementations, each session of a transaction can be independent, while being linked and enabling one or more of the sessions to be associated with one or more purchase restrictions. When a session contains a restriction condition item (e.g., an age restricted item) then the transaction can be designated a purchase restricted session for subsequent verification that the condition is satisfied (e.g., marked as age verification). Similarly, the exit audit APP 108 can implement APIs in implementing audits and restriction condition evaluations in verifying the sessions and transaction. The QR code or other encoded code used by the exit audit APP can include linked data and other relevant information to effectively obtain session information and/or authenticate. This transaction QR code utilized in combination with the associate APIs allows the exit audit APP 108 to scan a single QR code to pull up information for the sessions of a transaction.

The cart compile APP 112 further includes an additional option to initiate an additional session to be linked with one or more other sessions as a single transaction. Similarly, a confirmation of purchase user interface can include a notification that the transaction is a multi-session transaction, one or more option to view identifiers of the multiple sessions, one or more options to view item lists from one or more of the sessions and/or other such options. In some embodiments, the exit audit APP 108 similarly provides an option to initiate on behalf of the customer one or more additional sessions to be linked as a single transaction. This option and the flow can be controlled in part, in some implementations, by feature flags and session limits. With multiple sessions, some embodiments enable multiple different types of virtual carts a customer can establish. For example, one type would be a cart with no restricted items. Another cart may be a mixed type of cart with normal and restricted items. A further cart may be considered a restricted with only restricted items. Each session is executed independent of other sessions, while still being linked as a single transaction. Therefore, customers can have different types of carts and/or items for each transaction. Additionally or alternatively, customers can use different payment methods for different sessions. This allows customers to separate purchases (e.g., business vs. personal), make purchases using different payments (e.g., EBT Food and Cash), and other such advantages.

The linking of sessions simplifies the audit process and, in some instances, avoids introducing added delays or added complexity. The single transaction QR code enables access to information for each of the multiple sessions. Also, receipt details can be accessed to show the sessions and details of the transaction. Further, the audit can enable the exit associate to scan one or more products that can be identified as being included in any one of the sessions, and thus avoids the complexity of identifying products for particular sessions. Fraud protection is further enhanced based on the fraud evaluation across the multiple sessions, while decreasing unintentional fraud rejections for subsequent session in part based on a lack of fraud in a first session. During the audit process when an item is detected that is not included in one of the sessions, the exit associate can watch the customer implement an additional session and pay for that session to incorporate the identified item, and/or automatically initiate an additional session linked to the transaction and scan one or more items to be added to an additional virtual cart for which the customer can authorize payment.

Figure 6:
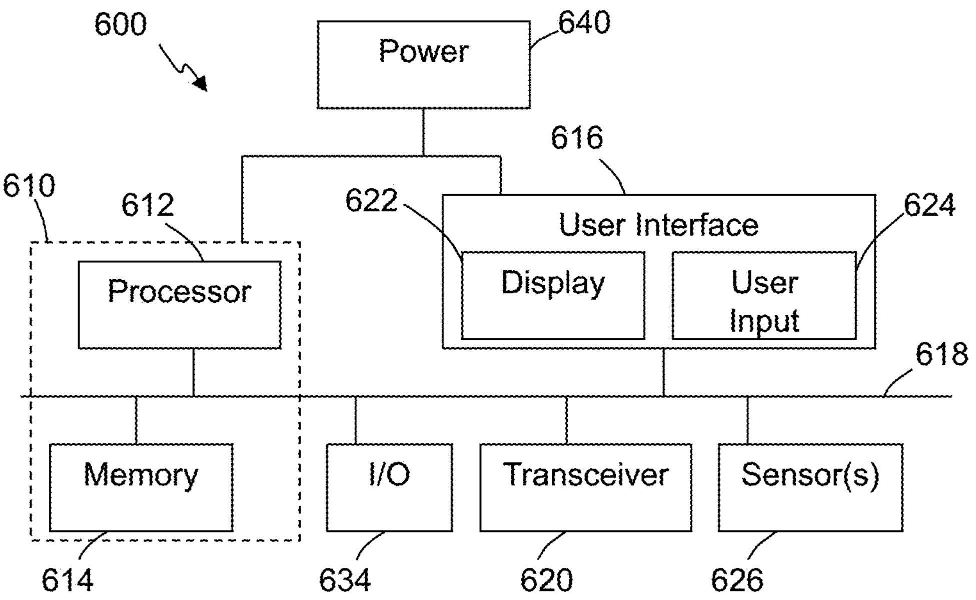
FIG. 6 illustrates an exemplary system for use in implementing methods, techniques, devices, apparatuses, systems, servers, sources and providing control in implementing retail purchases through customer computing devices, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of purchase enabling system 100, the purchase control system 102, the associate computing device 106, the customer computing device 110, the inventory system 120, retrieval system 122, delivery control system 124, and/or other above or below mentioned systems or devices, or parts of such circuits, circuitry, functionality, systems, apparatuses, processes, or devices. However, the use of the system 600 or any portion thereof is certainly not required.

By way of example, the system 600 may comprise one or more control circuits or processor modules 612, one or more memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network 104 (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the central control system, a delivery vehicle, etc. The sensors can include substantially any relevant sensor, such as optical-based scanning sensors to sense and read optical patterns (e.g., bar codes, QR codes, etc.), imaging systems, distance measurement sensors (e.g., optical units, sound/ultrasound units, etc.), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor-readable and/or computer-readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 104. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

In some embodiments, systems and corresponding methods performed by the systems to control a mobile device in purchasing items, comprise: a product database; a transaction database; a mobile purchase control circuit communicatively coupled over a distributed communication network with the product database, the transaction database, wherein the purchase control circuit is configured to: receive a session notification from a mobile customer computing device, associated with a customer and executing a cart compile application, to initiate an additional purchase session in response to an activation by the customer of an additional purchase option provided on a confirmation user interface displayed, in association with a first purchase session, on the customer computing device; establish, in response to the session notification, a second purchase session, and link the first purchase session and the second purchase session as a single transaction; incorporate into a second virtual cart, associated with the second purchase session and different than a first virtual cart associated with the first purchase session, item identification information for each of one or more items identified, through the customer computing device, by the customer and intended to be purchased by the customer in association with the second purchase session; and cause a final authentication of the single transaction in authenticating at a single time of both the first session and the second session.

Some embodiments provide methods of controlling a mobile device in purchasing items, comprising: receiving, at a mobile purchase control circuit and from over a distributed communication network, a session notification from a mobile customer computing device, associated with a customer and executing a cart compile application, to initiate an additional purchase session in response to an activation by the customer of an additional purchase option provided on a confirmation user interface displayed, in association with a first purchase session, on the customer computing device; establishing a second purchase session, in response to the session notification; linking the first purchase session and the second purchase session as a single transaction; incorporating into a second virtual cart, associated with the second purchase session and different than a first virtual cart associated with the first purchase session, item identification information for each of one or more items identified, through the customer computing device, by the customer and intended to be purchased by the customer in association with the second purchase session; and causing a final authentication of the single transaction in authenticating at a single time both the first session and the second session.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system to control a mobile customer computing device in purchasing items, comprising:

a product database;

a transaction database; and a mobile purchase control circuit communicatively coupled over a distributed communication network with the product database and the transaction database, wherein the mobile purchase control circuit is configured to:

receive a session notification from the mobile customer computing device, associated with a customer and executing a cart compile application, to initiate an additional purchase session in response to an activation by the customer of an additional purchase option provided on a confirmation user interface displayed, in association with a first purchase session, on the mobile customer computing device;

establish, in response to the session notification, a second purchase session, and link the first purchase session and the second purchase session as a single transaction;

incorporate into a second virtual cart, associated with the second purchase session and different than a first virtual cart associated with the first purchase session, item identification information for each of one or more items identified, through the mobile customer computing device, by the customer and intended to be purchased by the customer in association with the second purchase session;

identify that the first purchase session includes a first item having a purchase restriction condition;

designate the single transaction as a purchase restricted transaction based on the first purchase session including the first item;

encode an optical machine-readable representation with a first unique session identifier corresponding to the first purchase session and a second unique session identifier corresponding to the second purchase session;

display the optical machine-readable representation via the mobile customer computing device, wherein the optical machine-readable representation is scanned by an associate computing device;

in response to the associate computing device scanning the optical machine-readable representation, controlling the associate computing device to: decode the first unique session identifier and the second unique session identifier from the optical machine-readable representation, determine an error condition for the first purchase session based on the purchase restriction condition, and display a restriction condition user interface associated with the purchase restricted transaction and including an entry option configured to receive condition information related to the purchase restriction condition and an abort option;

receive condition information via the entry option or detect an activation of the abort option;

in response to receiving condition information via the entry option, determine whether the purchase restriction condition has been satisfied, and in response to determining the purchase restriction condition has been satisfied based on the condition information received via the entry option, cause a final authentication of the single transaction, wherein at a single time both the first purchase session and the second purchase session are authenticated; and in response to detecting the activation of the abort option, abort the first purchase session from the single transaction while maintaining the second purchase session as part of the single transaction and cause the final authentication of the single transaction, wherein the second purchase session is authenticated.

2. The system of claim 1, wherein the mobile purchase control circuit is configured to communicate transaction information to the mobile customer computing device comprising the first unique session identifier and the second unique session identifier.

3. The system of claim 2, wherein the mobile purchase control circuit in communicating the transaction information communicates a transaction restriction notification causing the mobile customer computing device, when displaying the optical machine-readable representation, to include a displayed designation indicating that the single transaction is a purchase restricted transaction and further display instructions to take a first action to satisfy the purchase restriction condition.

4. The system of claim 2, wherein the mobile purchase control circuit is configured to:

receive, from the mobile customer computing device, another abort notification corresponding to a third session linked to the single transaction; and abort the third session while maintaining as active the first purchase session and the second purchase session linked to the single transaction.

5. The system of claim 2, further comprising: an associate device control circuit of the associate computing device configured to execute an exit audit APP and to communicate via the distributed communication network with the mobile purchase control circuit, wherein the associate device control circuit in executing the exit audit APP is configured to: receive a current condition response associated with the purchase restriction condition based on interaction of an associate through the restriction condition user interface; and prevent authorization of a completion of a sale of at least the first item in at least the first purchase session in response to confirming, based on the current condition response, the purchase restriction condition is unsatisfied.

6. The system of claim 2, further comprising:

an associate device control circuit of the associate computing device configured to execute an exit audit APP and to communicate via the distributed communication network with the mobile purchase control circuit, wherein the associate device control circuit in executing the exit audit APP is configured to:

identify multiple scanned unique session identifiers extracted and decoded from the optical machine-readable representation in response to optically scanning, via the associate computing device, the optical machine-readable representation displayed by the mobile customer computing device corresponding to the single transaction, wherein each of the multiple scanned unique session identifiers corresponds to one of multiple purchase sessions linked to the single transaction;

receive, captured by the associate computing device, item identifying information for at least one of multiple physical items associated with the customer; and confirm that each item identifier is included in at least one of the multiple purchase sessions.

7. The system of claim 6, wherein the mobile purchase control circuit is configured to:

automatically establish, in response to a determination at an associate computing device that an identification of a first item attempting to be removed from a retail facility by the customer in association with other items of the single transaction is not an item included in one of the multiple purchase sessions of the single transaction, a third purchase session corresponding to a third virtual cart automatically implemented and incorporating at least a first item identifier of the first item; and additionally link the third purchase session to the single transaction.

8. The system of claim 1, wherein the mobile purchase control circuit is configured to: receive, from the associate computing device, multiple scanned unique session identifiers extracted and decoded by the associate computing device from the optical machine-readable representation in response to optically scanning the optical machine-readable representation displayed by the mobile customer computing device corresponding to the single transaction; determine an error condition associated with the first purchase session of the single transaction; and communicate a point of sale (POS) notification to the mobile customer computing device to control the mobile customer computing device to display an error user interface directing the customer to return to a POS system to complete a sale of one or more items associated with the first purchase session.

9. The system of claim 1, further comprising:

an associate device control circuit, of the associate computing device executing an exit audit APP, configured to:

identify, in response to scanning an optical machine-readable representation of the single transaction displayed on the mobile customer computing device, the first purchase session is in an error state;

identify, from a listing of recent point of sale (POS) purchase sessions, a first POS purchase session corresponding to the first purchase session; and cause a merging to link the first POS purchase session with the single transaction.

10. A method of controlling a mobile customer computing device in purchasing items by a mobile purchase control circuit, comprising:

receiving, from over a distributed communication network, a session notification from the mobile customer computing device, associated with a customer and executing a cart compile application, to initiate an additional purchase session in response to an activation by the customer of an additional purchase option provided on a confirmation user interface displayed, in association with a first purchase session, on the mobile customer computing device;

establishing a second purchase session, in response to the session notification;

linking the first purchase session and the second purchase session as a single transaction;

incorporating into a second virtual cart, associated with the second purchase session and different than a first virtual cart associated with the first purchase session, item identification information for each of one or more items identified, through the mobile customer computing device, by the customer and intended to be purchased by the customer in association with the second purchase session;

identifying that the first purchase session includes a first item having a purchase restriction condition;

designating the single transaction as a purchase restricted transaction based on the first purchase session including the first item;

encoding an optical machine-readable representation with a first unique session identifier corresponding to the first purchase session and a second unique session identifier corresponding to the second purchase session;

displaying the optical machine-readable representation via the mobile customer computing device, wherein the optical machine-readable representation is scanned by an associate computing device;

in response to the associate computing device scanning the optical machine-readable representation, controlling the associate computing device to: decode the first unique session identifier and the second unique session identifier from the optical machine-readable representation, determine an error condition for the first purchase session based on the purchase restriction condition, and display a restriction condition user interface associated with the purchase restricted transaction and including an entry option configured to receive condition information related to the purchase restriction condition and an abort option;

receiving condition information via the entry option or detecting an activation of the abort option;

in response to receiving condition information via the entry option, determining whether the purchase restriction condition has been satisfied, and in response to determining the purchase restriction condition has been satisfied based on the condition information received via the entry option, causing a final authentication of the single transaction, wherein at a single time both the first purchase session and the second purchase session are authenticated; and in response to detecting the activation of the abort option, aborting the first purchase session from the single transaction while maintaining the second purchase session as part of the single transaction and causing the final authentication of the single transaction, wherein in the second purchase session is authenticated.

11. The method of claim 10, further comprising:

communicating transaction information to the mobile customer computing device comprising the first unique session identifier the second unique session identifier.

12. The method of claim 11, further comprising:

wherein the communicating the transaction information comprises communicating a transaction restriction notification causing the mobile customer computing device, when displaying the optical machine-readable representation, to include a displayed designation indicating that the single transaction is a purchase restricted transaction and further display instructions to take a first action to satisfy the purchase restriction condition.

13. The method of claim 11, further comprising:

receiving, from the mobile customer computing device, an abort notification corresponding to a third session linked to the single transaction; and aborting the third session while maintaining as active the first purchase session and the second purchase session linked to the single transaction.

14. The method of claim 11, further comprising: receiving, via an exit audit APP executed on an associate device control circuit of the associate computing device, a current condition response based on interaction of an associate through the restriction condition user interface; and preventing, via the exit audit APP, authorization of a completion of a sale of at least the first item in at least the first purchase session in response to confirming, based on the current condition response, the purchase restriction condition is unsatisfied.

15. The method of claim 11, further comprising:

identifying, via an exit audit APP executed on an associate device control circuit of the associate computing device, multiple scanned unique session identifiers extracted and decoded from the optical machine-readable representation in response to optically scanning, via the associate computing device, the optical machine-readable representation displayed by the mobile customer computing device corresponding to the single transaction, wherein each of the multiple scanned unique session identifiers corresponds to one of multiple purchase sessions linked to the single transaction;

receiving, captured by the associate computing device, item identifying information for at least one of multiple physical items associated with the customer; and confirming, by the exit audit APP, that each item identifier is included in at least one of the multiple purchase sessions.

16. The method of claim 15, further comprising:

automatically establishing, in response to a determination at the associate computing device that an identification of a first item attempting to be removed from a retail facility by the customer in association with other items of the single transaction is not an item included in one of the multiple purchase sessions of the single transaction, a third purchase session corresponding to a third virtual cart automatically implemented and incorporating at least a first item identifier of the first item; and additionally linking the third purchase session to the single transaction.

17. The method of claim 10, further comprising:

receiving, from the associate computing device, multiple scanned unique session identifiers extracted and decoded by the associate computing device from the optical machine-readable representation in response to optically scanning the optical machine-readable representation displayed by the mobile customer computing device corresponding to the single transaction;

determining an error condition associated with the first purchase session of the single transaction; and communicating a point of sale (POS) notification to the mobile customer computing device to control the mobile customer computing device to display an error user interface directing the customer to return to a POS system to complete a sale of the one or more items associated with the first purchase session.

18. The method of claim 10, further comprising:

identifying, via an exit audit APP executed on an associate device control circuit of the associate computing device and in response to scanning the optical machine-readable representation of the single transaction displayed on the mobile customer computing device, the first purchase session is in an error state;

identifying, from a listing of recent point of sale (POS) purchase sessions, a first POS purchase session corresponding to the first purchase session; and causing a merging to link the first POS purchase session with the single transaction.

* * * * *